United States Patent
Kawanishi et al.

(10) Patent No.: US 8,373,826 B2
(45) Date of Patent: Feb. 12, 2013

(54) OPTICAL FILM AND METHOD FOR MANUFACTURING THE SAME

(75) Inventors: Hiroyuki Kawanishi, Kanagawa (JP); Hiromichi Furukawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 115 days.

(21) Appl. No.: 12/978,861

(22) Filed: Dec. 27, 2010

(65) Prior Publication Data

US 2011/0157524 A1 Jun. 30, 2011

(30) Foreign Application Priority Data

Dec. 28, 2009 (JP) ................... 2009-298576

(51) Int. Cl.
*G02F 1/1335* (2006.01)

(52) U.S. Cl. ........................ 349/96; 349/117

(58) Field of Classification Search ............... None
See application file for complete search history.

(56) References Cited

U.S. PATENT DOCUMENTS

| | | | |
|---|---|---|---|
| 2006/0286313 A1* | 12/2006 | Fukagawa et al. | 428/1.31 |
| 2009/0099308 A1* | 4/2009 | Takebe et al. | 525/54.21 |
| 2011/0141429 A1* | 6/2011 | Hisakado et al. | 349/158 |

FOREIGN PATENT DOCUMENTS

| | | |
|---|---|---|
| JP | 2009-179731 A | 8/2009 |
| JP | 2009-210777 A | 9/2009 |
| JP | 2009-271284 A | 11/2009 |
| WO | 2009/047924 A1 | 4/2009 |
| WO | 2009/081607 A1 | 7/2009 |

* cited by examiner

*Primary Examiner* — Wen-Ying P Chen
(74) *Attorney, Agent, or Firm* — Sughrue Mion, PLLC

(57) ABSTRACT

An optical film is provided and includes a cellulose ester and an acrylic resin. The mass ratio of the cellulose ester to the acrylic resin is 70/30 to 5/95, the total haze value of the optical film is 0.80 or less, the internal haze value of the optical film is 0.01 to 0.28, and the modulus of elasticity in the transverse direction of the optical film is 2,700 to 7,000 MPa.

19 Claims, 1 Drawing Sheet

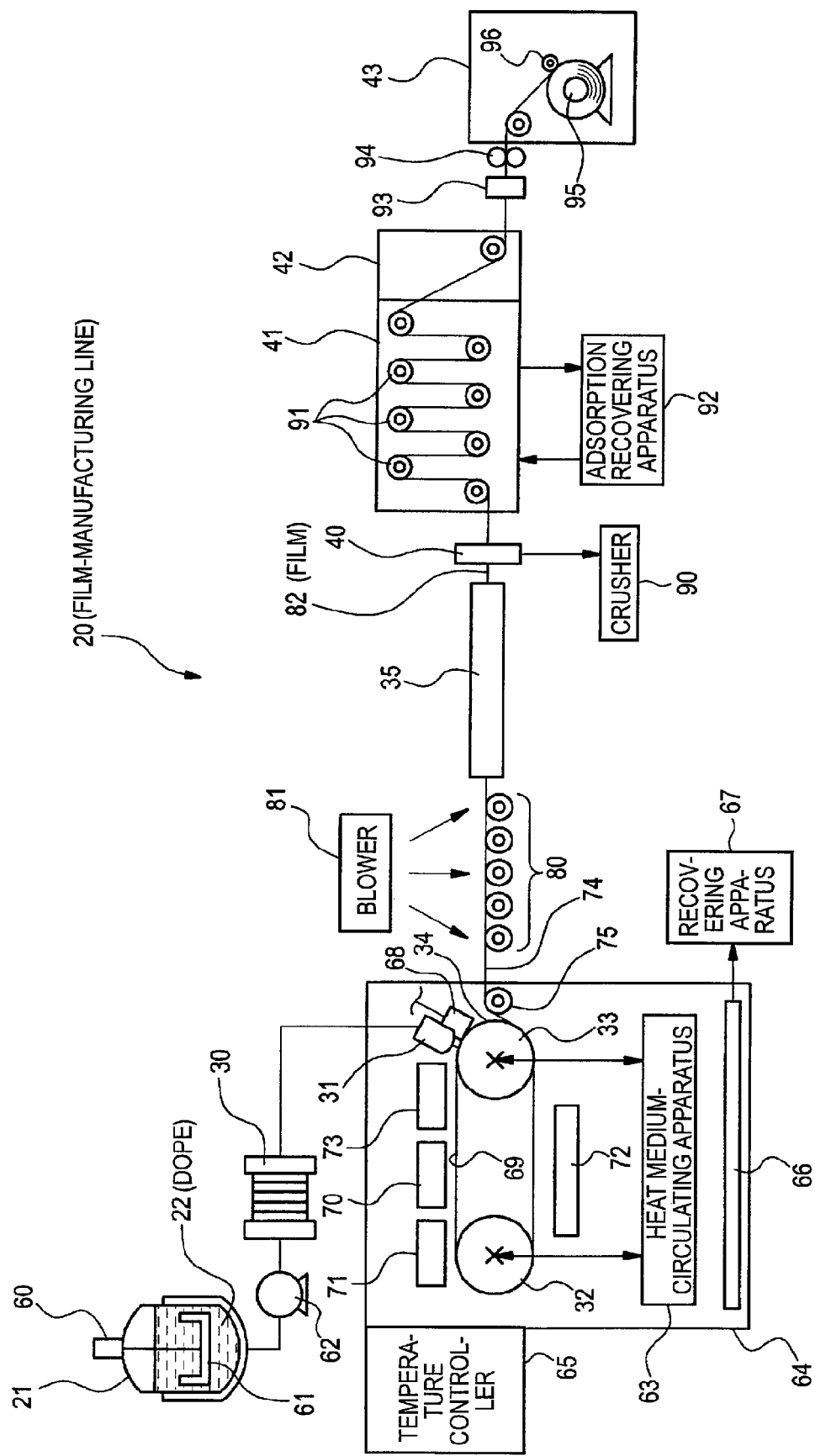

OPTICAL FILM AND METHOD FOR MANUFACTURING THE SAME

This application is based on and claims priority under 35 U.S.C. §119 from Japanese Patent Application No. 2009-298576, filed Dec. 28, 2009, the entire disclosure of which is herein incorporated by reference.

BACKGROUND OF THE INVENTION

1. Field of the Invention

The present invention relates to an optical film and a method for manufacturing the same.

2. Background Art

In recent years, liquid crystal displays are widely used in uses such as liquid crystal panels and the like, e.g., liquid crystal televisions, personal computers, portable telephones and digital cameras. In general, a liquid crystal display has a liquid crystal member having provided polarizing plates on both sides of a liquid crystal cell, and display is performed by controlling the light from the backlight member at the liquid crystal member. Here, the polarizing plate comprises a polarizer and the protective films on both sides of the polarizer. Ordinary polarizer can be obtained by dyeing a stretched polyvinyl alcohol (PVA) film with iodine or a dichroic dye, and a cellulose ester film or the like is used as the protective film. Cellulose ester films are high in transparency and optical isotropy, so that they are excellent as optical films.

Large-sizing and thinning of liquid crystal displays are progressing in recent years and uses are also diversifying, so that requirement for durability has been made rigorous.

For example, with the progress of thinning of liquid crystal displays, there arises a problem such that light unevenness, which seems like a circle or an ellipsoid occurs on the screen, and the improvement thereof is required. As a cause of generation of such light unevenness, it is indicated that the contact of a backlight member and a polarizing plate on the backlight side of a liquid crystal panel member is liable to occur due to thinning of a liquid crystal display. It is thought that when a liquid crystal display is used for a long period of term in the state of a backlight member and a polarizing plate on the backlight side being in contact with each other or a liquid crystal display is used under high temperature high humidity environment, water content is liable to gather at the contact area and the water content penetrates through to the polarizer, as a result the performance of the polarizing plate deteriorates to thereby cause light unevenness. As one measure to prevent such light unevenness, improvement of the moisture resisting property of the protective film of a polarizing plate is exemplified.

For the purpose of improving the moisture resisting property of the protective film of a polarizing plate, optical films in which a great amount of an acrylic resin such as polymethyl methacrylate (PMMA) is added to a cellulose ester resin are disclosed in WO 09/047,924 and WO 09/081,607. However, it has been found that liquid crystal displays having sufficient contrast ratio cannot be obtained with the optical films disclosed in Patent WO 09/047,924 and WO 09/081,607.

Further, in the manufacture of an optical film, retardation control of a film and stretching for widening the width are generally carried out. However, it has been found that a film itself is softened by the addition of a large amount of an acrylic resin such as PMMA and a problem arises such that the film ruptures by stretching in high magnification.

SUMMARY OF THE INVENTION

In view of such present situation, objects of the invention are to provide an optical film capable of controlling light unevenness and improving the contrast ratio of a liquid crystal display, and a manufacturing method of the same.

Other objects of the invention are to provide a film excellent in manufacturing aptitude and a manufacturing method of the same.

A further object is to provide a polarizing plate using the optical film. A still further object of the invention is to provide a liquid crystal display having a high contrast ratio and improved in light unevenness.

The above objects of the invention can be solved by the following means.

(1) An optical film comprising a cellulose ester and an acrylic resin,
wherein
a mass ratio (weight ratio) of the cellulose ester to the acrylic resin is 70/30 to 5/95,
the optical film has a total haze value of 0.80 or less, an internal haze value of 0.01 to 0.28, and a modulus of elasticity of 2,700 to 7,000 MPa in a transverse direction of the optical film.

(2) The optical film described in the above item (1), wherein Re and Rth defined by the following formulae (I) and (II) respectively satisfy the following formulae (III) and (IV) respectively at wavelength of 590 nm:

$$Re=(nx-ny) \times d \quad (I)$$

$$Rth=[(nx+ny)/2-nz] \times d \quad (II)$$

$$|Re| \leq 10 \quad (III)$$

$$|Rth| \leq 20 \quad (IV)$$

wherein nx represents a refractive index in a slow axis direction in a plane of the optical film, ny represents a refractive index in a fast axis direction in the plane, nz represents a refractive index in a thickness direction of the optical film, and d represents the thickness (nm) of the optical film.

(3) The optical film described in the above item (1) or (2), wherein the mass ratio of the cellulose ester to the acrylic resin is 50/50 to 5/95.

(4) The optical film described in any of the above items (1) to (3), wherein a ratio of the modulus of elasticity in a machine direction (MD) to the modulus of elasticity in the transverse direction (TD) of the cellulose ester film ((modulus of elasticity in TD)/(modulus of elasticity in MD)) is 1.15 or more.

(5) The optical film described in any of the above items (1) to (4), wherein the cellulose ester is cellulose acylate.

(6) The optical film described in the above item (5), wherein the cellulose acylate has a degree of acyl substitution of 1.00 to 2.95.

(7) The optical film described in any of the above items (1) to (6), wherein the acrylic resin contains 50% by mass (weight) or more of methyl methacrylate unit.

(8) A method for manufacturing an optical film including a cellulose ester and an acrylic resin, the method comprising:
forming a polymer film having a mass ratio of the cellulose ester to the acrylic resin of 70/30 to 5/95; and
stretching the polymer film within a temperature range of Tg±10° C., wherein Tg is a glass transition temperature of the polymer film.

(9) The method for manufacturing an optical film described in the above item (8), wherein a stretching magnification in stretching the polymer film is 1.3 to 2.0.

(10) The method for manufacturing an optical film described in the above item (8) or (9), wherein the mass ratio of the cellulose ester and acrylic resin is 50/50 to 5/95.

(11) The method for manufacturing an optical film described in any of the above items (8) to (10), wherein the polymer film is formed by casting a polymer solution containing the cellulose ester, the acrylic resin and a solvent on a support.

(12) The method for manufacturing an optical film described in any of the above items (8) to (11), wherein a modulus of elasticity at Tg+10° C., Tg being a glass transition temperature, of the polymer film is lower than that at Tg by 30% or more.

(13) The method for manufacturing an optical film described in any of the above items (8) to (12), wherein the modulus of elasticity of the polymer film before stretching is 2,000 MPa to 4,500 MPa.

(14) A polarizing plate comprising at least one optical film described in any of the above items (1) to (7).

(15) A liquid crystal display comprising at least one polarizing plate described in the above item (14).

According to an exemplary embodiment of the invention, it is possible to provide an optical film capable of controlling generation of light unevenness and improving the contrast ratio of a liquid crystal display. By the use of an optical film of the invention, the generation of light unevenness of the liquid crystal display can be suppressed and contrast ratio can be improved.

BRIEF DESCRIPTION OF DRAWING

The sole FIGURE is a schematic view of a film-manufacturing line for carrying out a solution film-forming method.

In the FIGURE, 20 represents a film-manufacturing line

DETAILED DESCRIPTION OF THE INVENTION

The invention will be described in detail below.

In the specification, when numerical values represent physical values and characteristic values, the description "from (numerical value 1) to (numerical value 2)" means "numerical value 1 or more and numerical value 2 or less". Further, "acrylic resin" means "a resin capable of obtaining by polymerization of a derivative of a methacrylic acid or an acrylic acid". Also, "(meth)acrylate" means acrylate and methacrylate, and "(meth)acryl" indicates acryl and methacryl, unless otherwise indicated.

(Optical Film)

An optical film in the invention is an optical film containing a cellulose ester and an acrylic resin, wherein the mass ratio (weight ratio) of the cellulose ester to the acrylic resin is 70/30 to 5/95. The total haze value of the optical film is 0.80 or less, the internal haze value is 0.01 to 0.28, and the modulus of elasticity in the transverse direction is 2,700 to 7,000 MPa.

By the above constitution, the generation of light unevenness of the liquid crystal display can be suppressed and contrast ratio can be improved.

(Cellulose Acylate)

Celluloses as the raw material of cellulose esters that can be used in the invention, cotton linter and wood pulps (hard wood pulp and soft wood pulp) are included. Cellulose esters obtained from any raw material cellulose can be used, and mixture of these pulps can be used according to cases. With respect to these raw material celluloses, celluloses described in, for example, Marusawa and Uda, *Plastic Zairyo Koza* (*Lectures on Plastic Material* (17), *Fibrous Resins*) (published by Nikkan Kogyo Shinbun, 1970) and celluloses described in Hatsumei Kyokai Kokai Giho (Journal of Technical Disclosure issued by Japan Institute of Invention), 2001-1745, pp. 7-8, but cellulose esters that can be used in the invention are not especially restricted to those described therein.

The cellulose ester in the invention is preferably cellulose acylate.

In the cellulose acylate of the invention, hydroxyl groups in cellulose are acylated, and as the acyl group substituting hydroxyl groups, any of acetyl groups having 2 to 22 carbon atoms can be used. In the cellulose acylate of the invention, as the measuring method of the degree of substitution of an acetic acid and/or a fatty acid having 3 to 22 carbon atoms substituting hydroxyl groups of the cellulose, methods in conformity with ASTM D-817-91 and NMR can be exemplified.

In the cellulose acylates for use in the invention, the degree of acyl substitution for hydroxyl groups of the cellulose is not especially restricted, but when the cellulose acylate is used for the protective film of a polarizing plate or an optical film, it is preferred that the degree of acyl substitution is higher in view of low moisture permeability and water absorbability of the film. Accordingly, the degree of acyl substitution (total degree of substitution) is preferably 1.00 to 2.95, more preferably 2.00 to 2.90 from the viewpoint of compatibility with an acrylic resin, and especially preferably 2.40 to 2.85.

Further, in view of the compatibility with an acrylic resin, the total of the substitution degree of an acetyl group and an acyl group having 8 or more carbon atoms is 1.3 or less, and more preferably 0.8 or less.

The groups having 2 to 22 carbon atoms of the acetic acid and/or the fatty acid having 3 to 22 carbon atoms substituting the hydroxyl groups of cellulose may be aliphatic or aromatic and they are not especially restricted, and either a single group or a mixture of two or more groups may be used. As cellulose acylates substituted with these groups, for example, alkylcarbonyl esters, alkenylcarbonyl esters or aromatic carbonyl esters, and aromatic alkylcarbonyl esters of cellulose each optionally having substituents are exemplified. The examples of preferred acyl groups substituting the hydroxyl groups of cellulose include an acetyl group, a propionyl group, a butanoyl group, a heptanoyl group, a hexanoyl group, an octanoyl group, a decanoyl group, a dodecanoyl group, a tridecanoyl group, a tetradecanoyl group, a hexadecanoyl group, an octadecanoyl, an iso-butanoyl group, a t-butanoyl group, a cyclohexanecarbonyl group, an oleoyl group, a benzoyl group, a naphthylcarbonyl group, a cinnamoyl group and the like. Of these groups, an acetyl group, a propionyl group, a butanoyl group, a dodecanoyl group, an octadecanoyl, a t-butanoyl group, an oleoyl group, a benzoyl group, a naphthylcarbonyl group, and a cinnamoyl group are preferred, an acetyl group, a propionyl group and a butanoyl group are more preferred, a propionyl group and a butanoyl group are still more preferred, and a propionyl group is especially preferred.

From the viewpoint of easiness of synthesis, manufacturing costs and easiness of control of the distribution of substituents, it is preferred to use in combination of an acetyl group and a propionyl group, an acetyl group and a butanoyl group, a propionyl group and a butanoyl group, an acetyl group, a propionyl group and a butanoyl group, more preferably in combination of an acetyl group and a propionyl group, an acetyl group and a butanoyl group, and an acetyl group, a propionyl group and a butanoyl group, still more preferably in combination of an acetyl group and a propionyl group, and an acetyl group, a propionyl group and a butanoyl group, and especially preferably in combination of an acetyl group and a propionyl group.

The degree of polymerization of cellulose acylate for use in the invention is 180 to 700 in viscosity average degree of polymerization. In cellulose acetate propionate, the degree of polymerization is more preferably 180 to 550, still more preferably 180 to 400, and especially preferably 180 to 350. When the degree of polymerization is too high, a dope solution of the cellulose acylate has high viscosity and it is difficult to form a film by casting. While when the degree of polymerization is too low, the strength of the film formed is liable to lower. The average degree of polymerization can be measured by a limiting viscosity method by Uda et al. (Kazuo Uda and Hideo Saito, *The Journal of the Fiber Society*, Vol. 18, No. 1, pp. 105-120 (1962)). The method is disclosed in detail in JP-A-9-95538 (the term "JP-A" as used herein refers to an "unexamined published Japanese patent application").

In the case where the molecular weight of the cellulose acylate is too low, the brittleness of the film worsens, while when it is too high, the compatibility of the film is deteriorated, and so it is necessary to select a proper molecular weight.

The number average molecular weight Mn of the cellulose acylate is preferably 18,000 to 300,000, more preferably 25,000 to 240,000, and especially preferably 40,000 to 240,000. The mass (weight) average molecular weight Mw of the cellulose acylate is preferably 75,000 to 300,000, more preferably 100,000 to 240,000, and especially preferably 160,000 to 240,000.

Further, the molecular weight distribution of the cellulose acylate preferably used in the invention is evaluated by gel permeation chromatography. A smaller polydispersity index Mw/Mn (Mw: mass average molecular weight, Mn: number average molecular weight) and a narrower molecular weight distribution are preferred. Specifically, an Mw/Mn value is preferably 1.0 to 4.0, more preferably 2.0 to 3.5, and most preferably 2.3 to 3.4.

When low molecular weight components are removed, the average molecular weight (degree of polymerization) rises but the viscosity becomes lower than ordinary cellulose acylates, and so useful. Low molecular weight components can be removed by washing cellulose acylate synthesized by a conventional method with an appropriate organic solvent. Further, in the case of manufacturing cellulose acylate containing less low molecular weight components, it is preferred to control the amount of a sulfuric acid catalyst in the acetylation reaction to 0.5 to 25 parts by mass (weight) per 100 parts by mass of the cellulose acylate. By controlling the amount of the sulfuric acid catalyst in the above range, cellulose acylate having narrow molecular weight distribution can be synthesized. When the cellulose acylate is used in the manufacture of the optical film of the invention, the water content of the cellulose acylate is preferably 2% by mass or less, more preferably 1% by mass or less, and especially preferably 0.7% by mass or less. In general, cellulose acylate contains water and it is known that the water content is 2.5% to 5% by mass. To adjust the water content of a cellulose acylate of the invention as described above, it is preferred to dry the cellulose acylate. The drying method is not especially restricted so long as a desired content is obtained. The raw material cottons and synthesis methods of these cellulose acylates of the invention are described in detail in *Hatsumei Kyokai Kokai Giho* (*Journal of Technical Disclosure issued by Japan Institute of Invention*), Kogi No. (Technical Open No.) 2001-1745 (issued by Japan Institute of Invention, Mar. 15, 2001), pp. 7-12.

In the invention, in the viewpoint of substituents, degree of substitution, degree of polymerization and molecular weight distribution, cellulose acylates can be used alone or a mixture of two or more different kinds may be used.

The content of cellulose ester in the optical film in the invention is preferably 70% to 5% by mass in the optical film, more preferably 50% to 5% by mass, still more preferably 40% to 20% by mass, still yet preferably 40% to 30% by mass, and especially preferably 40% to 35% by mass.

(Acrylic Resin)

The acrylic resins for use in the invention are resins containing the resins obtained by polymerization of derivatives of (meth)acrylic acids and the derivatives thereof, and they are not especially restricted so long as the advantages of the invention are not impaired.

As the derivatives of (meth)acrylic acids, (meth)acrylates can be exemplified. For example, alkyl (meth)acrylate homopolymers such as methyl acrylate, ethyl acrylate, N-propyl acrylate, N-butyl acrylate, tert-butyl acrylate, isopropyl acrylate, N-hexyl acrylate, cyclohexyl acrylate, t-butylcyclohexyl acrylate, methyl methacrylate, ethyl methacrylate, N-propyl methacrylate, N-butyl methacrylate, tert-butyl methacrylate, isopropyl methacrylate, N-hexyl methacrylate, cyclohexyl methacrylate, and t-butylcyclohexyl methacrylate; and alkyl (meth)acrylates such as 2-chloroethyl acrylate, 2-hydroxyethyl acrylate, 2,3,4,5-tetrahydroxypentyl acrylate, 2-chloroethyl methacrylate, 2-hydroxyethyl methacrylate, and 2,3,4,5-tetrahydroxypentyl methacrylate wherein optional hydrogen atoms are substituted with halogen atoms, hydroxyl groups or other organic residues may be used as the (meth)acrylate derivatives. Here, other organic residues are preferably straight chain, branched cyclic or cyclic alkyl groups having 1 to 20 carbon atoms.

The main component of the acrylic resin for use in the invention is preferably alkyl (meth)acrylate. The alkyl (meth)acrylate is preferably alkyl (meth)acrylate comprising an alkyl group having 1 to 18 carbon atoms and (meth)acrylic acid, more preferably alkyl (meth)acrylate comprising an alkyl group having 1 to 12 carbon atoms and (meth)acrylic acid, still more preferably methyl acrylate and methyl methacrylate, and especially preferably methyl methacrylate.

The acrylic resins for use in the invention may be homopolymers comprising a single (meth)acrylic acid derivative, may be copolymers of two or more kinds of (meth)acrylic acid derivatives, or may be copolymers comprising these (meth)acrylic acid derivatives and other monomers copolymerizable therewith.

As the copolymer components copolymerizable with (meth)acrylic acid derivatives, unsaturated acids such as α,β-unsaturated acids, e.g., acrylic acid, methacrylic acid, etc., and dicarboxylic acids containing an unsaturated group, e.g., maleic acid, fumaric acid, itaconic acid, etc., aromatic vinyl compounds, e.g., styrene, o-methylstyrene, m-methylstyrene, p-methylstyrene, 2,4-dimethylstyrene, p-ethylstyrene, p-tert-butylstyrene, α-methylstyrene, α-methyl-p-methylstyrene, etc., α,β-unsaturated nitriles, e.g., acrylonitrile, methacrylonitrile, etc., unsaturated carboxylic acid anhydrides, e.g., lactone ring unit, glutaric acid anhydride unit, maleic anhydride, etc., maleimides, e.g., maleimide, N-substituted maleimide, etc., and glutarimide unit are exemplified.

Aromatic vinyl compounds are preferred from the aspect of optical characteristics, and styrene is especially preferred.

From the viewpoint of advantage of the invention, the acrylic resin is preferably a homopolymer or copolymer of methyl methacrylate, it is more preferred to contain 50% by mass or more of methyl methacrylate unit, still more preferred to contain 50% to 99% by mass of methyl methacrylate unit (i.e., a copolymer comprising methyl methacrylate and other monomer), and especially preferred to contain 70% to 99% by mass.

As the monomers copolymerizable with methyl methacrylate, in addition to those exemplified as the monomers copolymerizable with the above-described alkyl (meth)acrylates, alkyl methacrylate comprising an alkyl group having 2 to 18 carbon atoms and methacrylic acid, and alkyl acrylate comprising an alkyl group having 1 to 18 carbon atoms and acrylic acid are exemplified, and they can be used alone or two or more monomers can be used in combination. From the standpoint of heat decomposition resistance and flowing property of copolymers, methyl acrylate, ethyl acrylate, n-propyl acrylate, n-butyl acrylate, s-butyl acrylate, and 2-ethylhexyl acrylate are preferred, and methyl acrylate and n-butyl acrylate are especially preferred.

As the acrylic resins, (meth)acrylic acid derivatives and other copolymerizable monomers in the invention, those disclosed in JP-A-2009-122664, JP-A-2009-139661, JP-A-2009-139754, JP-A-2009-294262 and WO 2009/054376 can also be used. However, these compounds do not restrict the invention. They can be used alone or in combination of two or more.

The acrylic resins which are used in the optical film of the invention preferably have a mass average molecular weight Mw of 80,000 or more from the points of improving brittleness as the optical film and improving transparency when compatilized with cellulose ester. The mass average molecular weight Mw of the acrylic resins is more preferably 80,000 to 1,000,000, still more preferably 100,000 to 600,000, and most preferably 150,000 to 400,000. The mass average molecular weight Mw of the acrylic resins can be measured by gel permeation chromatography.

The manufacturing method of the acrylic resin in the invention is not especially restricted, and any of known methods such as suspension polymerization, emulsion polymerization, block polymerization and solution polymerization may be used. As polymerization initiators, general peroxide-based and azo-based initiators can be used, and redox initiators may also be used. With respect to polymerization temperature, suspension polymerization and emulsion polymerization can be carried out at 30 to 100° C. and block polymerization and solution polymerization can be performed at 80 to 160° C. For regulating reduced viscosity of the obtained polymer, alkyl mercaptan may be used in the polymerization as a chain transfer agent.

Commercially available acrylic resins can also be used in the invention. For example, DELPET 60N an 80N (manufactured by Asahi Kasei Chemicals Corporation), DIANAL BR52, BR80, BR83, BR85, BR88 and BR102 (manufactured by Mitsubishi Rayon Co., Ltd.), and KT75 (manufactured by Denki Kagaku Kogyo Kabushiki Kaisha) are exemplified.

Acrylic resins may also be used in combination of two or more.

The content of acrylic resin in the optical film of the invention is preferably 30% to 95% by mass in the optical film, more preferably 50% to 95% by mass, still more preferably 60% to 80% by mass, still yet preferably 60% to 70% by mass, and especially preferably 65% to 70% by mass.

In the optical film of the invention, the mass ratio of the cellulose ester to the acrylic resin is 70/30 to 5/95. By the addition of the acrylic resin so as to reach the mass ratio of the cellulose ester to the acrylic resin of 70/30 or more, moisture resisting property of the optical film is improved and light unevenness of the liquid crystal display can be restrained. By the addition of the acrylic resin so as to obtain the mass ratio of the cellulose ester to the acrylic resin of 5/95 or less, thermal durability, brittleness, surface property, handling aptitude and surface treatment property of the film can be improved by the acrylic resin singly. Further, by containing the acrylic resin in the range of the mass ratio of the cellulose ester to the acrylic resin of 70/30 or more, low moisture permeability, water absorbability, and light unevenness under high temperature and high humidity environment can be improved and further preferred optical characteristics can be obtained. The mass ratio of the cellulose ester to the acrylic resin is 70/30 to 5/95, preferably 50/50 to 5/95, more preferably 40/60 to 20/80, still more preferably 40/60 to 30/70, and especially preferably 35/65 to 30/70.

In the optical film of the invention, from the point of total haze and internal haze, it is preferred that the cellulose ester and the acrylic resin are contained in a compatible state.

Whether the cellulose ester and the acrylic resin are in a compatible state or not can be judged by, for example, glass transition temperature Tg. For example, in the case where the glass transition temperatures of the cellulose ester and the acrylic resin are different, since each has each glass transition temperature, there are two or more glass transition temperatures in a mixture when both are mixed, but the glass transition temperature intrinsic to each resin disappears when both are compatible. As a result, two or more glass transition temperatures become one glass transition temperature of the compatibilized resin.

The glass transition temperature can be found with a differential scanning calorimeter (DSC) at a temperature rising speed of 10° C./min as the average value of the temperature of the time when the baseline resulting from the glass transition of a resin begins to change and the temperature of the time returning again to the baseline.

It is preferred that the cellulose ester and the acrylic resin are amorphous resins. Either one of the resins may be a crystalline polymer or may be a polymer partially crystalline, but it is preferred for the cellulose ester and the acrylic resin to become amorphous resins by compatibilization.

The mass average molecular weight Mw and the degree of substitution of the cellulose ester and the mass average molecular weight Mw of the acrylic resin in the optical film of the invention can also be obtained by the measurements by using the difference in solubility in solvents of both after fractionation. In fractionating resins, fractionation can be performed by the addition of compatibilized resins to a solvent capable of dissolving only either one resin and extracting the dissolved resin. Heating operation or refluxing may be carried out at this time. Resins may be fractionated by combining two or more processes of the combinations of these solvents. Resins can be fractionated by the operations of filtering the dissolved resin and the resin remaining as insoluble matter, evaporating the solvent of the solution containing the extract, and then drying. The fractionated resins can be specified by general structure analysis of polymers. When the optical film in the invention contains resins other than cellulose ester and acrylic resin, they can be fractionated by similar methods.

When the mass average molecular weights Mw of compatibilized resins are different from each other, fractionation is easily possible and also the molecular weight can be measured by gel permeation chromatography, since high molecular weight substances are eluted at early stage and the lower the molecular weight, the longer is the time to be taken for the substances to be eluted.

Further, at the same time with the measurement of the molecular weights of compatibilized resins by gel permeation chromatography, compatibilized resins can be respectively specified by quantitative analysis of the structure of the resin obtained by dispensing an eluted resin solution every interval of hour, distilling off the solvent and drying, and detecting the resin composition of every division each having a different molecular weight. It is also possible to detect compatibilized resins by gel permeation chromatography by measuring the molecular weight distributions of the resins dispensed in advance by the difference in solubility in a solvent.

Further, "the cellulose ester and the acrylic resin are contained in a compatible state" means that mixing each resin (polymer) results in a compatible state, which excludes the state of mixed resins obtained by mixing and polymerizing an acrylic resin precursor such as a monomer, a dimer or an oligomer with cellulose ester.

So long as the function as the optical film is not impaired, the optical film in the invention may consist of resins other than cellulose ester and acrylic resin and additives. When the optical film in the invention contains resins other than cellulose ester and acrylic resin, the resins added thereto may be in a compatible state or may be in a mixed state not being dissolved.

(Matting Agent Particles)

Particles may be added to the optical film in the invention as a matting agent. As the particles used as matting agents, silicon dioxide, titanium dioxide, aluminum oxide, zirconium oxide, calcium carbonate, clay, talc, calcined kaolin, calcined calcium silicate, calcium silicate hydrate, aluminum silicate, magnesium silicate and calcium phosphate are exemplified. Particles containing silicon are preferred in the point of capable of obtaining a film having low turbidity, and silicon dioxide is especially preferred. Silicon dioxide particles preferably have a primary average particle size of 20 nm or less, and an apparent specific gravity of 70 g/liter or more. Silicon dioxide particles having an average particle size of primary particles as small as 5 to 16 nm are more preferred for the reason of capable of lowering the haze of a film. The apparent specific gravity is preferably 90 to 200 g/liter or more, and more preferably 100 to 200 g/liter or more. The greater the apparent specific gravity, the higher is it possible to make high concentration dispersion, and haze and aggregates are preferably bettered.

These particles generally form secondary particles having an average particle size of 0.1 to 3.0 µm. These particles are present in a film as the aggregates of primary particles and form concavities and convexities of 0.1 to 3.0 µm on the surface of the film. The average particle size of secondary particles is preferably 0.2 µm or more and 1.5 µm or less, more preferably 0.4 µm or more and 1.2 µm or less, and most preferably 0.6 µm or more and 1.1 µm or less. The particle sizes of primary and secondary particles are obtained by observing the particles in a film with a scanning electron microscope and taking the diameter of a circumscribed circle of a particle as a particle size. Further, 200 particles are observed at various spots and the average value obtained is taken as the average particle size.

Silicon dioxide particles are commercially available, for example, by the trade name of AEROSIL R972, R972V, R974, R812, 200, 200V, 300, 8202, OX50 and TT600 (manufactured by Nippon Aerosil Co., Ltd.), and these products can be used in the invention. Zirconium oxide particles are commercially available, for example, by the trade name of AEROSIL R976 and R811 (manufactured by Nippon Aerosil Co., Ltd.) and these products can be used.

Of these products, AEROSIL 200V and R972V are silicon dioxide particles having a primary average particle size of 20 nm or less and apparent specific gravity of 70 g/liter or more. These particles have a great effect to reduce a friction coefficient while maintaining the turbidity of the optical film low, and so especially preferred.

In the invention, for obtaining an optical film containing particles having a small secondary average particle size, several means are considered in preparing the dispersion of particles. For example, one method comprises producing in advance particle dispersion by stirring and mixing a solvent and particles, adding the particle dispersion to a small amount of cellulose ester or acrylic resin solution which has been separately prepared, stirring the resulting solution to dissolve, and further mixing the dissolved solution with a main polymer solution (dope solution) for manufacturing a film. This is a preferred method in the points that good dispersibility of silicon dioxide particles can be obtained and the silicon dioxide particles are hardly re-aggregated. Besides the above, there is another method comprising adding a small amount of cellulose ester or acrylic resin to a solvent, stirring and dissolving the above mixture, adding particles to the above resin solution and dispersing the resulting solution with a disperser to prepare a particle addition solution, and thoroughly mixing the particle addition solution and a dope solution with an inline mixer. The invention is not limited to these methods. The concentration of silicon dioxide at the time of mixing silicon dioxide particles in a solvent for dispersion is preferably 5% to 30% by mass, more preferably 10% to 25% by mass, and most preferably 15% to 20% by mass. The higher the dispersion concentration, the lower is the solution turbidity to the addition amount, and haze and aggregates are preferably bettered.

The addition amount of a matting agent to the final dope solution is preferably 0.01 to 1.0 g/m$^2$, more preferably 0.03 to 0.3 g/m$^2$, and most preferably 0.08 to 0.16 g/m$^2$. Further, when the optical film is formed of multilayer structure, a matting agent is preferably not added to the inner layer and added only to the surface layer side. In such a case, the addition amount of the matting agent in the surface layer is preferably 0.001% by mass or more and 0.2% by mass or less, and more preferably 0.01% by mass or more and 0.1% by mass or less.

The solvents used in dispersion are preferably lower alcohols, e.g., methyl alcohol, ethyl alcohol, propyl alcohol, isopropyl alcohol, butyl alcohol and the like are exemplified. Solvents other than lower alcohols are not especially restricted, but it is preferred to use solvents for use at the time of the film-forming of optical film.

(Other Additives)

In addition to the matting particles, various additives can be added to the optical film of the invention (for example, plasticizers, UV absorbers, deterioration preventives, releasing agents, infrared absorbers, retardation adjustors, and wavelength dispersion adjustors), and these additives may be solids or oily matters. That is, the melting temperatures and boiling temperatures of additives are not especially restricted. For example, with respect to the mixture of UV absorbing materials having a melting temperature and a boiling temperature of 20° C. or less and 20° C. or more and the mixture of plasticizers having those of 20° C. or less and 20° C. or more, e.g., JP-A-2001-151901 can be referred to. Further, infrared absorbing dyes are disclosed in JP-A-2001-194522. Additives may be added at any time in the manufacturing process of a dope. Alternatively, an addition process of additives may be added to the final stage of a dope-preparing process. Further, the addition amount of each additive is not especially restricted so long as the function is exhibited. When the optical film is formed of multilayer structure, the kind and addition amount in each layer may be different, which are described in JP-A-2001-151902 and these are conventionally known techniques. Details thereof are described in *Hatsumei Kyokai Kokai Giho*, Kogi No. 2001-1745 (issued by Japan Institute of Invention, Mar. 15, 2001), and the materials described on pages 16 to 22 are preferably used.

Plasticizers excellent in compatibility with cellulose esters and acrylic resins are difficult to cause bleeding out and low in haze, and they are effective in making a film capable of realizing the manufacture of a liquid crystal display having excellent resistance to light leakage, front contrast and luminance.

Plasticizers may be used in the optical film of the invention. Plasticizers are not especially restricted, and phosphate-based plasticizers, phthalate-based plasticizers, polyhydric alcohol ester-based plasticizers, polyhydric carboxylate-based plasticizers, glycolate-based plasticizers, citrate-based plasticizers, fatty acid ester-based plasticizers, carboxylate-based plasticizers, polyester oligomer-based plasticizers, sugar ester-based plasticizers, and plasticizers based on copolymers comprising ethylenically unsaturated monomers are exemplified.

Of these plasticizers, preferred are phosphate-based plasticizers, glycolate-based plasticizers, polyhydric alcohol ester-based plasticizers, polyester oligomer-based plasticizers, sugar ester-based plasticizers, and plasticizers based on copolymers comprising ethylenically unsaturated monomers, more preferred are polyester oligomer-based plasticizers, sugar ester-based plasticizers, and plasticizers based on copolymers comprising ethylenically unsaturated monomers, still more preferred are plasticizers based on copolymers comprising ethylenically unsaturated monomers and sugar ester-based plasticizers, and most preferred are plasticizers based on copolymers comprising ethylenically unsaturated monomers.

In particular, polyester oligomer-based plasticizers, plasticizers based on copolymers comprising ethylenically unsaturated monomers, and sugar ester-based plasticizers are high in compatibility with the optical film of the invention, and they are effective to reduce bleeding out, to exhibit low haze and low moisture permeability, hardly cause decomposition of plasticizers themselves and deterioration and deformation of the film due to fluctuations of temperature and humidity and the lapse of time, so that preferably used in the invention.

In the invention, plasticizers may be used alone or two or more plasticizers may be used as mixture.

The optical film of the invention may also contain acrylic particles. It is disclosed in JP-B-60-17406 and JP-B-3-39095 (the term "JP-B" as used herein refers to an "examined Japanese patent publication") that impact resistance and stress whitening resistance can be improved by the addition of acrylic particles, in particular multilayer structural acrylic particulate composites.

When these additives are added to the optical film in the invention, the total amount of the additives is preferably 50% by mass or less of the optical film, and more preferably 30% by mass or less.

(Retardation)

An optical film having small optical anisotropy is preferably used in the invention. Specifically, it is preferred to manufacture a film such that Re and Rth measured at wavelength of 590 nm (defined by the following formulae (I) and (II), respectively) satisfy the following formulae (III) and (IV) respectively. These values can be regulated by the degree of substitution of cellulose ester cotton, the addition amount of the polyester-based oligomer and film thickness.

$$Re = (nx - ny) \times d \qquad (I)$$

$$Rth = [(nx + ny)/2 - nz] \times d \qquad (II)$$

$$|Re| \leq 10 \qquad (III)$$

$$|Rth| \leq 20 \qquad (IV)$$

In the formulae, nx represents a refractive index in the slow axis direction in the film plane, ny represents a refractive index in the fast axis direction in the film plane, nz represents a refractive index in the thickness direction of the film, and d represents the thickness (nm) of the film.

A film satisfying formulae (III) and (IV) has small optical anisotropy, and such a film can be preferably used as the protective film of a polarizing plate. Further, other functional layers can be provided with the optical film used as the protective film as a support. For example, an optical anisotropic layer and the like can be provided for the purpose of improving the contrast of display screen, characteristics of angle of visibility, and color tone.

As optical characteristics of the optical film in the invention, the values of formulae (III) and (IV) respectively satisfy the following formulae (III') and (IV'):

$$|Re| \leq 10 \qquad (III)$$

$$|Rth| \leq 15 \qquad (IV')$$

and more preferably the values of formulae (III) and (IV) respectively satisfy the following:

$$|Re| \leq 5 \qquad (III')$$

$$|Rth| \leq 10 \qquad (IV'')$$

Re and Rth at wavelength of λnm can be measured as follows.

Re is measured by making the light at wavelength λnm incident in the normal line direction of the film in KOBRA 21ADH (manufactured by Oji Scientific Instruments). Rth is computed by KOBRA 21ADH on the basis of the retardation values measured in total of three directions of the above Re, a retardation value measured by making the light at wavelength λnm incident from the direction inclined by +40° to the normal line direction of the film with the slow axis in the film plane (judged by KOBRA 21ADH) as the axis of inclination (axis of rotation), and a retardation value measured by making the light at wavelength λnm incident from the direction inclined by −40° to the normal line direction of the film with the slow axis in the film plane as the axis of inclination (axis of rotation). As supposed values of average refractive indices, the values described in *Polymer Handbook* (John Wiley & Sons, Inc.) and catalogues of various optical films can be used. Unknown values of average refractive indices can be measured with Abbe's refractometer. The values of average refractive indices of main optical films are shown below: cellulose acylate (1.48), cycloolefin polymer (1.52), polycarbonate (1.59), polymethyl methacrylate (1.49), and polystyrene (1.59). KOBRA 21AD computes nx, ny and nz by inputting the supposed values of these average refractive indices and the film thicknesses.

In the measurement of the optical film in the invention, the measurement of retardation is performed taking the average refractive index as 1.48.

(Film Thickness)

The thickness of the optical film of the invention is preferably 10 μm to 120 μm, more preferably 25 μm to 90 μm, and especially preferably 30 μm to 80 μm. When the optical film of the invention is used as the protective film of a polarizer to be stuck on a liquid crystal panel, for improving the light unevenness, the thickness is preferably 10 μm to 80 μm, more preferably 30 μm to 70 μm, and especially preferably 30 μm to 60 μm. When the value is in this range, a warp of a panel caused by temperature and humidity changes can be made small.

(Haze of Film)

The total haze value of the optical film of the invention is 0.80 or less, and the internal haze value is 0.01 to 0.28.

The total haze value of 0.80 or less is effective to improve the contrast ratio, light leakage and luminance of the liquid crystal display. The total haze value is more preferably 0.01 to 0.70, and still more preferably 0.01 to 0.60. The lower the total haze value, the more excellent is the optical performance, however, considering the selection of raw materials, manufacture control and handling property of a roll film, the above range is preferred.

By making the internal haze value 0.28 or less, the contrast ratio of a liquid crystal display can be improved. Further, by making the internal haze value 0.01 to 0.28, realization of high contrast ratio and excellent display characteristics becomes possible. The internal haze value is more preferably 0.01 to 0.20, and still more preferably 0.01 to 0.15.

The total haze value and internal haze value can be adjusted by the kinds and addition amounts of cellulose ester and acrylic resin of the film materials, selection of additives (in particular, particle size, refractive index and addition amount of matting agent particles), and, further, the manufacturing conditions of the film (temperature at the time of stretching and magnifications of stretching).

Haze can be measured according to JIS K-6714 with a film sample of the invention of 40 mm×80 mm, at 25° C. 60% RH and a haze meter (HGM-2DP, manufactured by Suga Test Instruments Co., Ltd.).

(Modulus of Elasticity of Film)

The modulus of elasticity in the transverse direction (TD) of the optical film of the invention is 2,700 to 7,000 MPa.

In the invention, the modulus of elasticity in the transverse direction in the above range is preferred in the viewpoints of light unevenness at the time of black display after aging under high humidity environment and high temperature high humidity environment, conveying property at film-forming time, manufacturing aptitude such as slitting property of the edge, and difficulty of rupture of film. When the modulus of elasticity in the transverse direction is too small, light unevenness easily occurs at the time of black display after aging under high humidity environment and high temperature high humidity environment, and there arise problems in manufacturing aptitude. While when it is too great, film processing property is deteriorated, accordingly the modulus of elasticity in the transverse direction is more preferably 2,800 to 5,000 MPa, and still more preferably 3,000 to 4,500 MPa.

The modulus of elasticity in the machine direction (MD) of the optical film of the invention is preferably 2,000 to 4,000 MPa, and more preferably 2,000 to 3,000 MPa.

Further, the ratio of the modulus of elasticity in TD and MD is preferably 1.15 or more in viewpoints of contrast and light leakage, more preferably 1.15 to 2.20, and still more preferably 1.25 to 2.00.

The machine direction (longitudinal direction) of a film is the conveying direction (MD) at film-forming time and the transverse direction is a vertical direction (TD) to the conveying direction at a film-forming time.

The modulus of elasticity of a film can be adjusted by the kinds and addition amounts of cellulose ester and acrylic resin of the film materials, selection of additives (in particular, particle size, refractive index and addition amount of matting agent particles), and, further, the manufacturing conditions of the film (magnifications of stretching).

The modulus of elasticity can be found by measuring the stress at a 0.5% elongation at a tensile speed of 10%/min in the atmosphere of 23° C. 70% RH with a multipurpose tensile tester STM T50BP (manufactured by Toyo Baldwin).

(Glass Transition Temperature Tg)

In view of the manufacturing aptitude and heat resisting property, the glass transition temperature Tg of the optical film in the invention is preferably 100° C. or more and 200° C. or less, and more preferably 115° C. to 150° C.

The glass transition temperature can be found with a differential scanning calorimeter (DSC) at a temperature rising speed of 10° C./min as the average value of the temperature of the time when the baseline resulting from the glass transition of a film begins to change and the temperature of the time returning again to the baseline.

The glass transition temperature can also be found with the following dynamic viscoelasticity measuring equipment. A film sample of the invention (not having been underwent stretching treatment) measuring 5 mm×30 mm is subjected to humidity conditioning at 25° C. 60% RH for 2 hours or more, and then Tg is measured with a dynamic viscoelasticity measuring equipment (Vibron DVA-225, manufactured by IT Keisoku Seigyo K.K.), at an inter-gripper distance of 20 mm, a temperature rising speed of 2° C./min, temperature range of measurement of 30° C. to 250° C., and a frequency of 1 Hz. When the storage modulus of elasticity is plotted as the axis of ordinate with a logarithmic axis and the temperature (° C.) as the axis of abscissa with a linear axis, a sharp reduction in the storage modulus of elasticity is seen at the time of migration of the storage modulus of elasticity from the solid region to the glass transition region. A straight line 1 is drawn along the sharp reduction in the solid region and a straight line 2 is drawn along the sharp reduction in the glass transition region. The intersection of the straight line 1 and the straight line 2 is taken as a glass transition temperature Tg (dynamic viscoelasticity), since it is a temperature at which the storage modulus of elasticity sharply decreases and the film sample begins to soften and migrate to the glass transition region under temperature rising.

(Spectral Characteristics and Spectral Transmittance)

The optical film in the invention preferably has spectral transmittance at wavelength 380 nm of 0.4% or more and 95% or less, and spectral transmittance at wavelength 350 nm of 10% or less.

Spectral transmittance can be measured as follows. The transmittance at wavelength of 300 nm to 450 nm of a film sample measuring 13 mm×40 mm can be measured at 25° C. 60% RH with a spectrophotometer U-3210 (manufactured by Hitachi, Ltd.). The tilting width can be found as (wavelength of 72%−wavelength of 5%). The limiting wavelength is represented by (tilting width/2)+wavelength of 5%. The absorption end can be expressed by the wavelength of transmittance of 0.4%. Thus, the transmittances at 380 nm and 350 nm can be evaluated.

(Equilibrium Water Content of Film)

When the optical film in the invention is used as the protective film of a polarizing plate, the water content (equilibrium water content) of the optical film in the invention at 25° C. 80% RH is preferably 0.1% to 4% by mass so as not to impair adhering property with a water-soluble polymer such as polyvinyl alcohol, irrespective of the film thickness. The water content is more preferably 0.1% to 2.5% by mass, and especially preferably 1% to 2% by mass. When the equilibrium water content is 4% by mass or less, dependency on humidity variation of retardation can be minimized, and so it is preferred also from the point of suppressing light unevenness at the time of black display after aging under room temperature, high humidity environment and high temperature high humidity environment of the liquid crystal display.

The water content is measured with a film sample measuring 7 mm×35 mm, a water content meter and a sample dryer (CA-03 and VA-05, both manufactured by Mitsubishi Chemical Corporation) according to Karl Fischer's method. The water content can be computed by dividing the amount of water (g) by the mass of the sample (g).

(Moisture Permeability of Film)

Moisture permeability of a film is measured on the condition of 60° C., 95% RH according to JIS Z-0208.

The thicker the film thickness, the smaller is the moisture permeability, and the thinner the film thickness, the greater is the moisture permeability. Accordingly, in samples different in thickness, moisture permeability needs to be computed in terms of film thickness of 80 μm. The conversion is made according to the following equation:

Moisture permeability in terms of 80 μm=measured permeability×measured thickness (μm)/80 (μm)

Concerning the method of measurement of moisture permeability, the methods described in the following are applicable to the invention: *Kobunshi no Bussei II* (*Physical Properties of Polymers II*) (Lectures on Polymer Experiment 4, Kyoritsu Shuppan Co., Ltd., pp. 285-294), "Measurement of Vapor Permeability (mass method, thermometer method, vapor pressure method, adsorption method)"

The moisture permeability of the optical film in the invention is preferably 100 to 2,000 g/m$^2$·24 h, more preferably 150 to 1,800 g/m$^2$·24 h, and especially preferably 150 to 1,500 g/m$^2$·24 h. When the moisture permeability is 4,000 g/m$^2$·24 h or less, humidity dependency of the Re value and Rth value of the film is small and preferred also from the point of suppression of light unevenness at the time of black display after aging under room temperature, high humidity environment and high temperature high humidity environment of the liquid crystal display.

(Dimensional Change of Film)

Concerning the dimensional stability of the optical film in the invention, the dimensional change is preferably 0.5% or less, more preferably 0.3% or less, and still more preferably 0.15% or less after aging at 60° C., 90% RH for 24 hours (high humidity condition) and 90° C., 5% RH for 24 hours (high temperature condition).

(Photoelastic Index)

When the optical film in the invention is used as the protective film of a polarizing plate, there are cases where birefringence (Re, Rth) changes due to stress by shrinkage of the polarizer. Such a change of birefringence due to stress can be measured as a photoelastic index, and the range of the photoelastic index is preferably 15 Br or less, more preferably −3 to 12 Br, and still more preferably 0 to 11 Br.

(Manufacturing Method of Film)

The manufacturing method of the optical film in the invention comprises a process of forming a polymer film having a mass ratio of cellulose ester and acrylic resin of 70/30 to 5/95, and a process of stretching the polymer film within the temperature range of Tg±10° C. with respect to the glass transition temperature Tg of the polymer film.

As described above, there are cases where a polymer film containing a large amount of acrylic resin ruptures by stretching. However, in the invention, a desired optical film can be manufactured without rupturing by using the process of stretching the polymer film within the temperature range of Tg±10° C. with respect to the glass transition temperature Tg of the polymer film. The thus-manufactured optical film can restrain generation of light unevenness and improve contrast ratio.

The mass ratio of the cellulose ester and the acrylic resin of the polymer film is 70/30 to 5/95, and preferably the cellulose ester and the acrylic resin are in a compatible state. The glass transition temperature Tg of the polymer film is preferably 100° C. to 200° C., and more preferably 110° C. to 150° C. The glass transition temperature can be adjusted by the kinds and mass ratio of the cellulose ester and the acrylic resin.

As the film-forming method of the polymer film, manufacturing methods such as an inflation method, a T-die method, a calendering method, a cutting method, a casting method, an emulsion method and a hot press method can be used, but in view of inhibition of coloration, suppression of foreign matter defects, and reduction of optical defects such as die line, solution film-forming according to a casting method is preferred.

In the solution casting method, a polymer solution (dope) containing cellulose ester, acrylic resin and a solvent is cast on a support to thereby form a polymer film.

The mass ratio of the cellulose ester and the acrylic resin in the dope is 70/30 to 5/95, preferably 50/50 to 5/95, more preferably 40/60 to 20/80, still more preferably 30/70 to 40/60, and especially preferably 35/65 to 30/70.

(Solvent)

Solvents useful for forming a dope are not restricted and any solvents can be used with no limitation so long as they can dissolve cellulose ester, acrylic resin and other additives at the same time.

In the invention, both chlorine-based solvents containing a chlorine-based organic solvent as the main solvent and non-chlorine solvents not containing a chlorine-based organic solvent can be used as organic solvents. Two or more organic solvents may be used as mixture.

In manufacturing a dope, chlorine-based organic solvents are preferably used as the main solvent. In the invention, the kinds of the chlorine-based organic solvents are not especially restricted so long as the object can be attained, that is, they can dissolve cellulose acylate, and cast the solution to thereby form a film. These chlorine-based organic solvents are preferably dichloromethane and chloroform, and dichloromethane is especially preferred. Organic solvents other than the chlorine-based organic solvents can also be mixed without hindrance. In such a case, it is necessary that dichloromethane accounts for at least 50% by mass in the total amount of the organic solvents. Other organic solvents for use in combination with the chlorine-based organic solvents in the invention are described below. Preferred other organic solvents are selected from esters, ketones, ethers, alcohols and hydrocarbons each having 3 to 12 carbon atoms. The esters, ketones, ethers and alcohols may have a cyclic structure. Compounds having any two or more functional groups of esters, ketones and ethers (i.e., —O—, —CO— and —COO—) can also be used as the solvents, for example, other functional groups such as alcoholic hydroxyl groups may be present at the same time. In the case of solvents having two or more functional groups, the number of carbon atoms is within the specified range of the compound having these functional groups.

The examples of esters having 3 to 12 carbon atoms include ethyl formate, propyl formate, pentyl formate, methyl acetate, ethyl acetate and pentyl acetate. The examples of ketones having 3 to 12 carbon atoms include acetone, methyl ethyl ketone, diethyl ketone, diisobutyl ketone, cyclopentanone, cyclohexanone and methyl cyclohexanone. The examples of ethers having 3 to 12 carbon atoms include diisopropyl ether, dimethoxymethane, dimethoxyethane, 1,4-dioxane, 1,3-dioxolan, tetrahydrofuran, anisole and phenethol. The examples of organic solvents having 2 or more functional groups include 2-ethoxyethyl acetate, 2-methoxyethanol and 2-butoxyethanol.

Alcohols for use in combination with chlorine-based organic solvents are preferably straight chain, branched, or cyclic, and saturated aliphatic hydrocarbons are especially preferred. The hydroxyl groups of the alcohols may be primary, secondary or tertiary. The examples of the alcohols include methanol, ethanol, 1-propanol, 2-propanol, 1-butanol, 2-butanol, t-butanol, 1-pentanol, 2-methyl-2-butanol and cyclohexanol. Fluorine-based alcohols are also used as the alcohols, e.g., 2-fluoroethanol, 2,2,2-trifluoroethanol, and 2,2,3,3-tetrafluoro-1-propanol are exemplified. The hydrocarbons may be straight chain, branched, or cyclic. Both of aromatic hydrocarbons and aliphatic hydrocarbons can be used. The aliphatic hydrocarbons may be saturated or unsaturated. The examples of the hydrocarbons include cyclohexane, hexane, benzene, toluene and xylene.

As other solvents, the solvents disclosed in JP-A-2007-140497 can be used.

(Preparation of Dope)

Dopes can be prepared by ordinary methods of performing treatment at a temperature of 0° C. or higher (normal temperature or a high temperature). Dopes in the invention can be prepared by preparation methods and apparatus used in general solvent casting methods. In the case of ordinary methods, it is preferred to use halogenated hydrocarbon (in particular, dichloromethane) and alcohol (in particular, methanol), ethanol, 1-propanol, 2-propanol, 1-butanol, 2-butanol, t-butanol, 1-pentanol, 2-methyl-2-butanol and cyclohexanol) as organic solvents.

The total amount of cellulose ester and acrylic resin is adjusted to be contained in proportion of 10% to 40% by mass in a polymer solution to be obtained. The amount of cellulose acylate is more preferably 10% to 30% by mass. To the organic solvents (main solvents) may be added in advance the later-described arbitrary additives.

A solution can be prepared by stirring cellulose ester, acrylic resin and an organic solvent at ordinary temperature (0° C. to 40° C.). A high concentration solution may be subjected to stirring on the condition of pressuring and heating. Specifically, cellulose ester, acrylic resin and an organic solvent are put in a pressure vessel and sealed, and stirred under pressure while heating at a temperature within a range from the boiling temperature of the solvent at room temperature or higher to the temperature at which the solvent does not boil.

The heating temperature is generally 40° C. or higher, preferably 60° C. to 200° C., and more preferably 80° C. to 110° C.

Each component may be roughly mixed in advance and then put in a vessel. Alternatively, each component may be put in a vessel in order. It is necessary that the vessel is constructed so as to have a stirring function. Pressure can be applied to the vessel by injecting inert gas such as nitrogen gas. Rising of vapor pressure of the solvent by heating may be utilized. After sealing the vessel, each component may be put in the vessel under pressure.

In heating, it is preferred to perform heating from the outside of the vessel. For example, a jacket-type heating apparatus can be used. It is also possible to provide a plate heater outside the vessel for heating the vessel at large by piping and circulating a liquid.

It is preferred to provide a stirring blade in the vessel for stirring. The stirring blade preferably has a length reaching near the wall of the vessel. It is preferred to provide a scraping blade at the end of the stirring blade for the renewal of liquid film on the wall of the vessel.

The vessel may be equipped with instruments such as a pressure gauge and a thermometer. Each component is dissolved in a solvent in the vessel. The prepared dope is taken out of the vessel after cooling, or cooled with a heat exchanger or the like after being taken out.

(Manufacture of Film—Solution Film-Forming Method)

In the next place, a method of manufacturing the optical film of the invention with the above-obtained dope will be explained.

The FIGURE is a schematic view showing film-manufacturing line 20. However, the invention is not limited to the film-manufacturing line shown in the FIGURE. Film manufacturing line 20 is equipped with stock tank 21, filtering equipment 30, casting die 31, casting band 34 straining around rollers 32 and 33, and tenter-style dryer 35. Further, selvage-cutting apparatus 40, drying room 41, cooling room 42, and winding room 43 are arranged.

Stock tank 21 is equipped with stirrer 61 driven by motor 60. Stock tank 21 is connected to casting die 31 via pump 62 and filtering equipment 30.

The width of casting die 31 is not especially restricted but is preferably 1.1 to 2.0 times the width of the film of final product.

Casting band 34 straining around rollers 32 and 33 is provided below casting die 31. Rollers 32 and 33 rotate by driving apparatus now shown in the FIGURE, and casting band 34 continues endless traveling with the rotation.

For bringing the surface temperature of casting band 34 to a prescribed value, it is preferred that rollers 32 and 33 are equipped with heating medium-circulating apparatus 63. It is preferred that casting band 34 is capable of adjusting the surface temperature thereof at −20° C. to 40° C.

The width of casting band 34 is not especially limited but is preferably in the range of 1.1 times to 2.0 times the cast width of dope 22. Casting band 34 preferably has a length of 20 m to 200 m, a thickness of 0.5 mm to 2.5 mm, and is preferably polished to obtain surface roughness of 0.05 µm or less. Casting band 34 is more preferably made of SUS316 to have sufficient corrosion resistance and strength. Further, the total thickness unevenness of casting band 34 is preferably 0.5% or less.

Incidentally, it is also possible to use rollers 32 and 33 directly as a support.

Casting die 31 and casting band 34 are housed in casting room 64. Casting room 64 is equipped with temperature controller 65 to maintain the inside temperature at a prescribed value, and condenser 66 to condense and recover evaporating organic solvent. Recovering apparatus 67 for recovering the condensate of the organic solvent is provided on the outside of casting room 64. It is preferred that reduced pressure chamber 68 is arranged for pressure-controlling the back part of a casting bead formed from casting die 31 down to casting band 34, and this is used in the exemplary embodiment.

Air blowing ports 70, 71, 72 and 73 for evaporating the solvent in cast film 69 are provided near the rotating surface of casting band 34.

Blower 81 is provided at connecting corridor 80, and crusher 90 for cutting the chips of selvage of film 82 is connected to selvage-cutting apparatus 40 on the downstream of tenter-style dryer 35.

Many rollers 91 are provided in drying room 41, and adsorption recovering apparatus 92 for adsorption recovering the gas of the solvent generated by evaporation is attached to drying room 41. On the downstream of cooling room 42 is provided forcing destaticizer 93 (destaticizing bar) for adjusting the charged voltage of film 82 to the prescribed range (e.g., −3 kV to +3 kV). Further, in the exemplary embodiment, on the downstream of forcing destaticizer 93 is arbitrarily provided knurling-imparting roller 94 for imparting knurling to both selvages of film 82 by embossing process. Winding roller 95 for winding film 82 and press roller 96 for controlling the tension at the time of winding are provided in winding room 43.

An example of manufacturing methods of film 82 by using the above film-manufacturing line 20 will be explained below.

Dope 22 is always homogenized by the rotation of stirrer 61. Additives such as plasticizers and UV absorbers can also be mixed with dope 22 during this stirring.

Dope 22 is sent to filtering equipment 30 by pump 62 to be filtered, and then cast from casting die 31 onto casting band 34.

A casting bead is formed from casting die 31 down to casting band 34, and cast film 69 is formed on casting band 34. The temperature of dope 22 in casting is preferably −10° C. to 57° C.

Dope 22 forms a casting bead from casting die 31 down to casting band 34.

Cast film 69 travels with the transfer of casting band 34.

In the next place, cast film 69 is continuously conveyed to the place the upper part of which is arranged air blowing port 73. Drying air is blown to cast film 69 from the nozzle of air blowing port 73.

As a result of evaporation of the solvent by drying, cast film 69 comes to have a self-supporting property, and then cast film 69 is peeled from casting band 34 as wet film 74 (a polymer film) while being supported by peeling roller 75. The residual amount of the solvent at the time of peeling is preferably 20% to 250% by mass as solid content standard. After that, wet film 74 is sent to tenter-style dryer 35 through connecting corridor 80 where many rollers are provided. Drying of wet film 74 is expedited by blowing drying air of a desired temperature from blower 81 at connecting corridor 80. The temperature of the drying air is preferably 20° C. to 250° C. It is also possible to give drawing tension to wet film 74 in the casting direction by making the rotation speed of the roller on the downstream side faster than the rotation speed of the roller on the upstream side at connecting corridor 80.

Wet film 74 sent to tenter-style dryer 35 is dried while being transferred and clipping both selvages. It is preferred to divide the inside of tenter-style dryer 35 to temperature zones and arbitrarily adjust drying condition of every division. In the invention, it is possible to stretch wet film 74 in the transverse direction by using tenter-style dryer 35.

Thus, at least one direction of casting direction and transverse direction of wet film 74 can be stretched with at least one of connecting corridor 80 and tenter-style dryer 35.

In the invention, the stretching temperature is in the temperature range of Tg±10° C. with respect to the glass transition temperature Tg of the unstretched polymer film after film formation. Here, "the glass transition temperature of the unstretched polymer film after film formation" is the glass transition temperature in compatible state of the cellulose ester and the acrylic resin, which is, as described above, preferably 100° C. to 200° C., and more preferably 110° C. to 150° C. The temperature at stretching time is preferably in the range of Tg±10° C. By stretching at the temperature in this range, a desired optical film can be manufactured without rupturing the wet film. The possibility of rupture of a film increases when stretching is carried out at the temperature lower than Tg−10° C. While when stretching is performed at the temperature higher than Tg+10° C., phase separation in the film is accelerated, and total haze and internal haze are liable to increase.

The stretching magnifications in the transverse direction are preferably 1.1 to 2.0 magnifications (30% to 100%), more preferably 1.3 to 2.0 magnifications, and especially preferably 1.3 to 1.8 magnifications. When the stretching magnifications are in this range, an optical film in which total haze and internal haze are restrained is obtained, and the contrast ratio and luminance of the liquid crystal display can be improved. Stretching direction may be only in the transverse direction or may be both of casting direction and transverse direction.

Further, from the viewpoint of the realization of diversity of film characteristics in an optimal temperature range where phase separation is difficult to occur, the modulus of elasticity of a polymer film at Tg is preferably lower than the modulus of elasticity at Tg+10° C. by 30% or more, more preferably lower by 30% to 90%, and especially preferably lower by 50% to 90%.

Stretching treatment may be carried out during film-forming process like this, or a wound web after film formation may be subjected to stretching treatment.

Wet film 74 is dried to a prescribed residual solvent amount with tenter-style dryer 35, and then sent out to the downstream side as film 82. Selvages on both sides of film 82 are cut with selvage-cutting apparatus 40. The cut selvages are sent to crusher 90 by a cutter blower not shown in the FIGURE. The selvages of the film are crushed and become chips. The chips are reused in the preparation of a dope, and so this method is useful in the point of manufacturing cost. The cutting process of the selvages of film can be omitted, but it is preferred to perform cutting in any process from the casting process to the process of winding a film.

Film 82 both selvages of which have been cut is sent to drying room 41 and further dried. The temperature in drying room 41 is not especially restricted, but is preferably in the range of 50° C. to 160° C. In drying room 41, film 82 is conveyed while being wound around roller 91, and the gas of the solvent generated by evaporation is recovered by adsorption by adsorption recovering apparatus 92. The air from which the solvent component is removed is blown into drying room 41 again as drying air. It is more preferred that drying room 41 is divided to two or more divisions to change the drying temperature.

Film 82 is cooled in cooling room 42 to almost room temperature. A humidity conditioning room may be provided between room 41 and room 42 (not shown in the FIGURE). It is preferred that the air conditioned to a desired humidity and temperature is blown to film 82 in this humidity conditioning room. Generation of curling of film 82 and generation of winding failure in winding can be generated by this treatment.

Charged voltage of film 82 during conveying of film 82 is adjusted to the prescribed range (e.g., −3 kV to +3 kV) by forcing destaticizer 93 (destaticizing bar). It is preferred to provide knurling-imparting roller 94 for imparting knurling to both selvages of film 82 by embossing process.

Finally, film 82 is wound by winding roller 95 in winding room 43. At this time, it is preferred to wind a film while giving a desired tension to press roller 96. Tension is preferably gradually changed from the beginning of winding to finishing time. The length of the film to be wound is preferably at least 100 m or more in the longitudinal direction (casting direction). The width of film 82 is preferably 600 mm or more, more preferably 1,100 mm or more and 2,900 mm or less, and still more preferably 1,800 mm or more and 2,500 mm or less.

In the solution film-forming method in the invention, at the time when a dope is cast, two or more dopes can be subjected to simultaneous lamination co-casting or successive lamination co-casting. Further, both co-casting methods may be combined. In performing simultaneous lamination co-casting, a casting die equipped with a feed block may be used, or a multi-manifold type casting die may be used. In a film comprising multi-layers by co-casting, it is preferred that the layer thickness of at least either of the layer thickness on the air side and layer thickness on the support side is 0.5% to 30% of the entire film thickness. Further, in performing simultaneous lamination co-casting, it is preferred for the high viscosity dope to be enveloped in the low viscosity dope when a dope is cast from the die slit to the support. In performing simultaneous lamination co-casting, of the beads formed from the die slit to the support, the composition ratio of alcohol is preferably higher in the dope in contact with the outside than the dope of the inside.

The structures of casting dies, reduced pressure chambers, and supports, co-casting, peeling methods, stretching, drying condition in each process, handling methods, curling, winding methods after rectifying distortion of plane, recovering methods of solvents, and collecting methods of film are disclosed in detail in JP-A-2005-104148, paragraphs (0617) to (0889).

In the above, one manufacturing method of the optical film of the invention is described by the example of casting a dope on a band, but a dope may be cast on a drum.

(Contact Angle on Film Surface by Alkali Saponification Treatment)

As one useful means of surface treatment in the case of using the optical film in the invention as the protective film for a polarizing plate, alkali saponification treatment is exemplified. In this case, the contact angle on the film surface after alkali saponification treatment is preferably 55° or less, more preferably 50° or less, and still more preferably 45° or less.

As one example of alkali saponification treatment, a method of immersing an optical film in a 1.5N sodium hydroxide aqueous solution at 55° C. for 2 minutes, washing it in a water-washing bath at room temperature, neutralizing with 0.05N sulfuric acid at 30° C., washing it again in a water-washing bath at room temperature, and drying with hot air at 100° C. is exemplified. However, the invention is not limited to this condition and method.

Alkali saponification solution is not especially restricted. Besides sodium hydroxide, potassium hydroxide can be used.

The concentration of alkali saponification solution is not especially restricted, but from the state of film surface and saponification performance, 0.1N to 10N is preferred, 1.0N to 8.0N is more preferred, and 1.0N to 5.0N is especially preferred.

(Surface Treatment)

By performing surface treatment, adhesion of the optical film and various functional layers (e.g., a polarizer, an undercoat layer and a backing layer) can be improved, according to cases. For example, glow discharge treatment, UV irradiation treatment, corona discharge treatment, flame treatment, acid treatment and alkali treatment can be used. As the glow discharge treatment here, low temperature plasma occurring under low pressure gas of $10^{-3}$ to 20 Ton may be used, or plasma treatment under atmospheric pressure may be used. Plasma exciting gas is gas excited by plasma in the above condition, argon, helium, neon, krypton, xenon, nitrogen, carbon dioxide, fluorocarbons such as tetrafluoromethane and mixtures thereof are exemplified. These are described in detail in *Hatsumei Kyokai Kokai Giho*, Kogi No. 2001-1745 (issued by Japan Institute of Invention, Mar. 15, 2001), pp. 30-32, and preferably used in the invention.

(Functional Layers)

The optical use of the optical film in the invention is especially preferably a liquid crystal display, and further preferred liquid crystal display has the structure comprising a liquid crystal cell carrying liquid crystal between two electrodes, two sheets of polarizing elements arranged on both sides thereof, and at least one optically compensatory sheet between the liquid crystal cell and the polarizing elements. As such liquid crystal displays, TN, IPS, FLC, AFLC, OCB, STN, ECB, VA and HAN are preferred.

In using the optical film of the invention in the above optical use, various kinds of functional layers are provided. Such functional layers are, e.g., an antistatic layer, a curable resin layer (a transparent hard coat layer), an antireflection layer, an easily adhering layer, an antiglare layer, an optically compensatory layer, an orientation layer, and a liquid crystal layer. As these functional layers and the materials of the layers, a surfactant, a sliding agent, a matting agent, an antistatic layer, and a hard coat layer are exemplified, and these are described in detail in *Hatsumei Kyokai Kokai Giho*, Kogi No. 2001-1745 (issued by Japan Institute of Invention, Mar. 15, 2001), pp. 32-45. The descriptions therein can be preferably used in the invention.

(Polarizing Plate)

The optical film in the invention is especially useful as the protective film for a polarizing plate. When the optical film of the invention is used as the protective film for a polarizing plate, the manufacturing method of the polarizing plate is not especially restricted and it can be manufactured by conventional methods. According to one method, the obtained optical film is subjected to alkali treatment, and the optical film is adhered to both surfaces of a polarizer manufactured by immersing a polyvinyl alcohol film in an iodine solution and stretching. Adhesion is carried out with a completely saponified polyvinyl alcohol aqueous solution. In place of alkali treatment, easy adhering process as disclosed in JP-A-6-94915, JP-A-6-118232 may be used. The surface treatment as described above may be performed.

As the adhesive used for adhering the treated surface of the protective film and the polarizer, polyvinyl alcohol-based adhesives, e.g., polyvinyl alcohol and polyvinyl butyral, and vinyl-based latex, e.g., butyl acrylate are exemplified.

A polarizing plate comprises a polarizer and protective films for protecting both surfaces of the polarizer, and further, a protective film is stuck on one surface and a separating film is stuck on the opposite surface. The protective film and separating film are used for the purpose of protecting the polarizing plate at the time of shipping and product inspection of the polarizing plate. In this case, the protective film is adhered for protecting the surface of the polarizing plate and is used on the side opposite to the surface where the polarizing plate is adhered to the liquid crystal plate. The separating film is used for covering the adhesive layer to be stuck to the liquid crystal plate, and is used on the side where the polarizing plate is adhered to the liquid crystal plate.

A substrate containing liquid crystal is generally arranged between two polarizing plates in a liquid crystal display. The polarizing plate-protective film using the optical film of the invention can exhibit excellent display characteristics irrespective of the part to be arranged. Since a transparent hard coat layer, an antiglare layer and an antireflection layer are provided on the polarizing plate-protective film of the outermost surface on the display side of the liquid crystal display, it is especially preferred to use the polarizing plate-protective film on this part.

(Optically Compensatory Film)

The optical film in the invention can be used in various uses, and to use as the optically compensatory film of a liquid crystal display is particularly effective. The optically compensatory film is generally used in a liquid crystal display and is an optical material which compensates for phase difference and has the same meaning with the phase difference plate and the optically compensatory sheet. The optically compensatory film has birefringence and is used for the purpose of eliminating coloration of display screen of a liquid crystal display and improving characteristics of angle of visibility.

When the optical film of the invention having small anisotropicity is manufactured so as to have Re and Rth as small as $|Re|\leq 5$ nm and $|Rth|\leq 10$ nm, and is used in combination with an optical anisotropic layer having birefringence, only the optical performance of the optical anisotropic layer can be mainly exhibited, and so preferably used.

Accordingly, when the optical film in the invention is used as the support of the optically compensatory film of a liquid crystal display, any optical anisotropic layer can be used in combination. In this case, any anisotropic layer that is required as the optically compensatory film can be used in combination without being restricted by the optical performance of the liquid crystal cell of the liquid crystal display in which the optical film of the invention is used, and by the driving system. The optical anisotropic layer to be used in combination may be formed of the composition containing a liquid crystal compound, or may be formed of a polymer film having birefringence. As the liquid crystal compound, a discotic liquid crystal compound or a rod-shaped liquid crystal compound is preferably used.

(Structure of General Liquid Crystal Display)

A liquid crystal display has structure comprising a liquid crystal cell carrying liquid crystal between two electrodes, two sheets of polarizing plates arranged on both sides thereof, and at least one optically compensatory film between the liquid crystal cell and the polarizing plate, if necessary.

The liquid crystal layer of a liquid crystal cell is generally formed by enclosing liquid crystal in the space formed by inserting spacer between two substrates. The transparent electrode layer is formed on the substrate as a transparent support containing a conductive substance. The liquid crystal cell may further be provided with a gas barrier layer, a hard coat layer or an under coat layer (this is used for adhesion of the transparent electrode layer). These layers are generally provided on the substrate. The substrate of a liquid crystal cell generally has a thickness of 50 μm to 2 mm.

(Kind of Liquid Crystal Display)

The cellulose acylate film of the invention can be used in liquid crystal cells of various modes. Various display modes such as TN (Twisted Nematic), IPS (In-Plane Switching), FLC (Ferroelectric Liquid Crystal), AFLC (Anti-Ferroelectric Liquid Crystal), OCB (Optically Compensatory Bend), STN (Super Twisted Nematic), VA (Vertically Aligned), ECB (Electrically Controlled Birefringence), and HAN (Hybrid Aligned Nematic) are proposed. Further, display modes obtained by orientation division are also proposed. The cellulose acylate film of the invention is effective in the liquid crystal display of any display mode. Also, the cellulose acylate film is effective in the liquid crystal display of any of transmission type, reflection type, and semi-transmission type.

(IPS-Type Liquid Crystal Display)

The Cellulose Acylate Film of the Invention is Especially Advantageously Used as the support or the protective film of the polarizing plate of the optically compensatory sheet of IPS type liquid crystal display having a liquid crystal cell of an IPS mode. In these modes, the liquid crystal materials are oriented almost in parallel at the time of black display, that is, black is displayed by orientating liquid crystal molecules almost in parallel to the substrate face in the state of no application of the voltage. In these modes, the polarizing plate using the cellulose acylate film of the invention is effective in the reduction of the change in color tone and contrast by angle of visibility.

$|Re|\leq 10$ nm, $|Rth|\leq 20$ nm are preferred, $|Re|\leq 10$ nm, $|Rth|\leq 15$ nm are more preferred, and $|Re|\leq 5$ nm, $|Rth|\leq 10$ nm are still more preferred, and further, in the region of 450 to 650 nm, 0 nm or less is especially preferred for the reason of little change in color tone.

In this embodiment, of the protective films of the upper and lower polarizing plates of the liquid crystal cell, it is preferred to use a polarizing plate using the optical film of the invention top and bottom of the liquid crystal cell in the protective film (the protective film on the cell side) arranged between the liquid crystal and the polarizing plate. It is more preferred to arrange an optical anisotropic layer whose retardation value is set at 2 times or less of the value of Δn·d between the protective film of the polarizing plate and the liquid crystal cell on one side.

(Hard Coat Film, Antiglare Film, and Antireflection Film)

The optical film in the invention can be applied to a hard coat film, an antiglare film, and an antireflection film. For the purpose of improving visibility of flat panel display such as LCD, PDP, CRT and EL, any one or all of a hard coat layer, an antiglare layer, and an antireflection layer may be provided on one side or both sides of the optical film in the invention. Preferred embodiment of these antiglare layer and antireflection layer is described in detail in *Hatsumei Kyokai Kokai Giho (Journal of Technical Disclosure issued by Japan Institute of Invention)*, Kogi No. (Technical Open No.) 2001-1745 (issued by Japan Institute of Invention, Mar. 15, 2001), pp. 54-57, and cellulose acylate film of the invention can be preferably used.

EXAMPLES

The invention will be described in detail below with reference to examples, but the invention is not restricted to these examples.

(Manufacture of Optical Films 101 to 132 and 141)

(Preparation of Dope)

The following-shown composition is put in a mixing tank, stirred while heating to be dissolved, thus a dope is prepared.

(Composition of Dope)

| | |
|---|---|
| Acrylic resin A (DIANAL BR85, manufactured by Mitsubishi Rayon Co., Ltd.) | 67 parts by mass |
| Cellulose ester A (cellulose acetate propionate, total degree of substitution of acyl group: 2.5, degree of substitution of acetyl group: 0.4, degree of propionyl substitution: 2.1, Mw = 200,000) | 33 parts by mass |
| Dichloromethane | 264 parts by mass |
| Ethanol | 36 parts by mass |

The cellulose ester used here is as follows.

To cellulose is added sulfuric acid as a catalyst (7.8 parts by mass to 100 parts by mass of cellulose), carboxylic acid is then added as the starting material of acyl substituent, and acylation reaction is carried out at 40° C. At this time, the degree of substitution of acetyl group and propionyl group is adjusted by adjusting the amount of carboxylic acid. Ripening is performed at 40° C. after acylation. Further, the low molecular weight component of cellulose acylate is washed with acetone and removed.

The above-prepared dope is uniformly cast from a casting die to an endless band made of stainless steel (a casting support) with a band casting apparatus as shown in the FIGURE. When the residual amount of the solvent in the dope reached 40% by mass, the cast dope is peeled as a polymer film. Optical samples 101 to 132 is obtained by stretching the film in the transverse direction (TD), and drying in the drying zone while conveying the film. Optical sample 141 is obtained by fixing both selvages with a tenter having clips but not performing stretching and conveying the film through the tenter zone while drying in the tenter zone. Various conditions such as the temperature in stretching and stretching magnifications are shown in Table 1 below.

(Tg of Polymer Film)

The glass transition temperature Tg of the polymer film (acrylic resin/cellulose ester) before stretching is measured with a differential scanning calorimeter (RDC220, manufactured by Seiko Instruments Inc.). The measured values are shown in Table 1 below. The "temperature based on Tg (° C.)" in Table 1 means a temperature difference between the temperature in stretching and the glass transition temperature (based on the glass transition temperature).

Films 101 to 104 ruptured at stretching time. Films 133 to 137 are prepared in the same manner as in the manufacture of Films 101 to 132 by changing the ratio of acrylic resin and cellulose ester as shown in Table 1. Films 138 to 140 are prepared in the same manner as in the manufacture of Films 101 to 132 by changing the dope composition as follows.

(Dope Composition of Film 138)

| | |
|---|---|
| Acrylic resin A (DIANAL BR85, manufactured by Mitsubishi Rayon Co., Ltd.) | 67 parts by mass |
| Cellulose ester B (cellulose triacetate degree of substitution of acetyl group: 2.85, Mw = 190,000) | 33 parts by mass |
| Dichloromethane | 264 parts by mass |
| Ethanol | 36 parts by mass |

(Dope Composition of Film 139)

| | |
|---|---|
| Acrylic resin A (DIANAL BR85, manufactured by Mitsubishi Rayon Co., Ltd.) | 67 parts by mass |
| Cellulose ester C (cellulose diacetate degree of substitution of acetyl group: 2.43, Mw = 190,000) | 33 parts by mass |
| Dichloromethane | 264 parts by mass |
| Ethanol | 36 parts by mass |

(Dope Composition of Film 140)

| | |
|---|---|
| Acrylic resin B (DIANAL BR52, manufactured by Mitsubishi Rayon Co., Ltd.) | 67 parts by mass |
| Cellulose ester A (cellulose acetate propionate, total degree of substitution of acyl group: 2.5, degree of substitution of acetyl group: 0.4, degree of propionyl substitution: 2.1, Mw = 200,000) | 33 parts by mass |

| | |
|---|---|
| Dichloromethane | 264 parts by mass |
| Ethanol | 36 parts by mass |

Films 105 to 141 are evaluated as follows. The results obtained are shown in Table 2 below.

(Manufacturing Aptitude)

Conveying property at film-forming time, manufacturing aptitude such as slitting property of the edge, difficulty of rupture of film and winding are synthetically evaluated.

A: Rupture and slipping out do not occur at film-forming time.

B: There are cases where rupture and slipping out occur at film-forming time.

C: Rupture occurs at film-forming time and film manufacture is difficult.

(Surface State of Film)

A manufactured film is wound in a roll state, and a sample is cut out from the roll in a size of total width and 1,000 mm in the longitudinal direction. The state of the film as it is and the surface of the sample in the state of being put between polarizing plates of cross nicol arrangement are visually observed.

A: Step-like and grid-like unevenness, wrinkle, scratch and luminescent spot are hardly observed.

B: Step-like and grid-like unevenness, wrinkle, scratch and luminescent spot are observed at a part of the film.

C: Step-like and grid-like unevenness, wrinkle, scratch and luminescent spot are clearly observed all over the film.

(Retardation Value)

A manufactured optical film is subjected to humidity conditioning at 25° C. 60% RH for 2 hours or more, and then Re value and Rth value at 25° C. 60% RH and at wavelength of 590 nm are measured with a birefringence measuring apparatus KOBRA 21ADH (manufactured by Oji Scientific Instruments).

(Haze)

Total haze (H) and internal haze (Hi) can be measured with a sample of 40 mm×80 mm according to the following method.

1) Total haze of the film (H) is measured according to JIS K-7136 with a haze meter NDH2000 (manufactured by Nippon Denshoku Industries Co., Ltd.).

2) A few drops of liquid paraffin are dropped on the obverse and reverse of the film, the film is sandwiched between two glass plates (micro-slide glass, No. S 9111, manufactured by MATSUNAMI) having a thickness of 1 mm to completely optically stick two glass plates and the obtained film, and haze is measured in a state of excluding surface haze. Separately, liquid paraffin alone is inserted between two glass plates and haze is measured, and a computed value by subtracting this haze value from the above haze is taken as internal haze (Hi).

(Modulus of Elasticity)

The modulus of elasticity in TD direction and MD direction is found by measuring the stress at a 0.5% elongation at a tensile speed of 10%/min in the atmosphere of 23° C. 70% RH with a multipurpose tensile tester STM T50BP (manufactured by Toyo Baldwin).

(Manufacture of Polarizing Plate)

Optical films 105 to 141 are subjected to corona discharge treatment.

A polarizing film is obtained by continuously stretching a polyvinyl alcohol film having a thickness of 80 μm in a roll state in an iodine aqueous solution at 5 magnifications, and drying.

One sheet of optical film 105 and one sheet of commercially available cellulose acetate film (FUJITAC TD60UL, manufactured by Fuji Photo Film Co., Ltd.) having been subjected to alkali saponification treatment are stuck in a state of sandwiching the polarizing film with a 3% aqueous solution of polyvinyl alcohol (PVA-117H, manufactured by Kuraray Co., Ltd.) as an adhesive to obtain a polarizing plate. Optical films 106 to 141 are also similarly processed to thereby obtain polarizing plates. At this time, the axis of transmission of the polarizer and the conveying direction (MD) of each of optical films 105 to 141 are arranged to be orthogonal to each other, and the axis of transmission of the polarizer and the slow axis of commercially available cellulose ester film are arranged to be orthogonal to each other.

(Mounting on IPS-Type Liquid Crystal Display)

The polarizing plate of commercially available IPS-TV is carefully peeled. Each of the above-manufactured polarizing plate is adhered on both sides of IPS cell with an adhesive in a manner that each of optical films 105 to 141 is set between IPS cell and the polarizer.

Light leakage, front contrast, and light unevenness of the thus-manufactured liquid crystal display occurring at lighting-up time (light unevenness, which seems like a circle or an ellipsoid) after aging under high humidity environment and high temperature high humidity environment are evaluated.

(Light Leakage)

After humidity conditioning of the above liquid crystal display at 25° C. 60% RH for 24, a light is put to the lamp, and 2 hours after that, the degree of light leakage at the time of black display after aging under high humidity environment and high temperature high humidity environment are visually evaluated.

A: Light leakage is hardly observed.
B: Light leakage is observed at a part of the film.
C: Light leakage is clearly observed all over the film.

(Front Contrast)

Concerning the above liquid crystal display, luminance values of black display and white display in the normal direction of the panel are measured in a dark room with a measuring apparatus (BM5A, manufactured by TOPCON CORPORATION), and front contrast (white luminance/black luminance) is computed. The distance between the measuring apparatus and the panel at this time is 700 mm.

(Degree of Light Unevenness at the Time of Black Display after Aging Under High Humidity Environment and High Temperature High Humidity Environment)

The above liquid crystal display is allowed to stand high humidity environment at 25° C. 90% RH and high temperature high humidity environment at 40° C. 90% RH, 50° C. 80% RH, 60° C. 80% RH for 24 hours, then subjected to humidity conditioning at 25° C. 60% RH for 24 hours, and then continuous lighting for 48 hours, after that, light unevenness (luminance unevenness) at the time of black display is observed. Light unevenness at the time of black display is observed at the front of the liquid crystal display and evaluated according to the following criteria. The relationships in the degree of light unevenness by different optical films are almost the same under any condition.

A: Unevenness is hardly observed under the environment of luminance of 100 1x.
B: Slight unevenness is observed under the environment of luminance of 100 1x.
C: Clear unevenness is observed under the environment of luminance of 100 1x.

The results of evaluations are shown in Table 2 below.

TABLE 1

| Film | Composition | | Ratio (part by mass) *1 | Tg (° C.) | Stretching Condition (transverse direction) | | |
|---|---|---|---|---|---|---|---|
| | Acrylic Resin | Cellulose Ester | | | Temperature (° C.) | Temperature based on Tg (° C.) | Magnification (%) |
| 101 | A | A | 67/33 | 120 | 105 | −15 | 10 |
| 102 | A | A | 67/33 | 120 | 105 | −15 | 30 |
| 103 | A | A | 67/33 | 120 | 105 | −15 | 50 |
| 104 | A | A | 67/33 | 120 | 105 | −15 | 100 |
| 105 | A | A | 67/33 | 120 | 110 | −10 | 10 |
| 106 | A | A | 67/33 | 120 | 110 | −10 | 30 |
| 107 | A | A | 67/33 | 120 | 110 | −10 | 50 |
| 108 | A | A | 67/33 | 120 | 110 | −10 | 100 |
| 109 | A | A | 67/33 | 120 | 115 | −5 | 10 |
| 110 | A | A | 67/33 | 120 | 115 | −5 | 30 |
| 111 | A | A | 67/33 | 120 | 115 | −5 | 50 |
| 112 | A | A | 67/33 | 120 | 115 | −5 | 100 |
| 113 | A | A | 67/33 | 120 | 120 | 0 | 10 |
| 114 | A | A | 67/33 | 120 | 120 | 0 | 30 |
| 115 | A | A | 67/33 | 120 | 120 | 0 | 50 |
| 116 | A | A | 67/33 | 120 | 120 | 0 | 100 |
| 117 | A | A | 67/33 | 120 | 125 | 5 | 10 |
| 118 | A | A | 67/33 | 120 | 125 | 5 | 30 |
| 119 | A | A | 67/33 | 120 | 125 | 5 | 50 |
| 120 | A | A | 67/33 | 120 | 125 | 5 | 100 |
| 121 | A | A | 67/33 | 120 | 130 | 10 | 10 |
| 122 | A | A | 67/33 | 120 | 130 | 10 | 30 |
| 123 | A | A | 67/33 | 120 | 130 | 10 | 50 |
| 124 | A | A | 67/33 | 120 | 130 | 10 | 100 |
| 125 | A | A | 67/33 | 120 | 135 | 15 | 10 |
| 126 | A | A | 67/33 | 120 | 135 | 15 | 30 |
| 127 | A | A | 67/33 | 120 | 135 | 15 | 50 |
| 128 | A | A | 67/33 | 120 | 135 | 15 | 100 |
| 129 | A | A | 67/33 | 120 | 140 | 20 | 10 |
| 130 | A | A | 67/33 | 120 | 140 | 20 | 30 |
| 131 | A | A | 67/33 | 120 | 140 | 20 | 50 |

TABLE 1-continued

| Film | Composition Acrylic Resin | Composition Cellulose Ester | Ratio (part by mass) *1 | Tg (° C.) | Stretching Condition (transverse direction) Temperature (° C.) | Stretching Condition (transverse direction) Temperature based on Tg (° C.) | Stretching Condition (transverse direction) Magnification (%) |
|---|---|---|---|---|---|---|---|
| 132 | A | A | 67/33 | 120 | 140 | 20 | 100 |
| 133 | A | A | 30/70 | 130 | 140 | 10 | 50 |
| 134 | A | A | 25/75 | 134 | 140 | 6 | 50 |
| 135 | A | A | 50/50 | 125 | 135 | 10 | 50 |
| 136 | A | A | 95/5 | 111 | 120 | 9 | 50 |
| 137 | A | A | 98/2 | 108 | 110 | 2 | 50 |
| 138 | A | B | 67/33 | 134 | 145 | 11 | 50 |
| 139 | A | C | 67/33 | 137 | 150 | 13 | 50 |
| 140 | B | A | 67/33 | 125 | 135 | 10 | 50 |
| 141 | A | A | 67/33 | 120 | — | — | 0 |

*1 Mass ratio of acrylic resin/cellulose ester in the optical film

TABLE 2

| Film | Manufacturing Aptitude | Film Surface State | Film Thickness (μm) | Re (nm) | Rth (nm) | Total Haze (%) | Internal Haze (%) | Modulus of Elasticity MD/MPa | Modulus of Elasticity TD/MPa | Modulus of Elasticity TD/MD | Light Leakage | Front Contrast | Light Unevenness at the Time of Black Display after Aging under High Humidity Environment and High Temperature High Humidity Environment | Remarks |
|---|---|---|---|---|---|---|---|---|---|---|---|---|---|---|
| 101 | C | | | | | Measurement is impossible due to rupture of the film. | | | | | | | | Comp. |
| 102 | C | | | | | Measurement is impossible due to rupture of the film. | | | | | | | | Comp. |
| 103 | C | | | | | Measurement is impossible due to rupture of the film. | | | | | | | | Comp. |
| 104 | C | | | | | Measurement is impossible due to rupture of the film. | | | | | | | | Comp. |
| 105 | A | A | 55 | −2.7 | 3.7 | 0.52 | 0.10 | 2,548 | 2,890 | 1.13 | A | 1,390 | A | Inv. |
| 106 | A | A | 46 | −8.3 | 5.3 | 0.51 | 0.08 | 2,478 | 3,310 | 1.34 | A | 1,436 | A | Inv. |
| 107 | A | A | 40 | −10.0 | 7.9 | 0.48 | 0.06 | 2,409 | 3,730 | 1.55 | A | 1,450 | A | Inv. |
| 108 | A | A | 30 | −19.3 | 11.9 | 0.57 | 0.05 | 2,235 | 4,780 | 2.14 | B | 1,367 | A | Inv. |
| 109 | A | A | 55 | −1.9 | 3.5 | 0.53 | 0.08 | 2,566 | 2,885 | 1.12 | A | 1,398 | A | Inv. |
| 110 | A | A | 46 | −5.9 | 4.9 | 0.52 | 0.08 | 2,496 | 3,304 | 1.32 | A | 1,437 | A | Inv. |
| 111 | A | A | 40 | −9.6 | 7.4 | 0.52 | 0.07 | 2,426 | 3,724 | 1.54 | A | 1,443 | A | Inv. |
| 112 | A | A | 30 | −12.1 | 10.6 | 0.57 | 0.05 | 2,251 | 4,773 | 2.12 | B | 1,382 | A | Inv. |
| 113 | A | A | 55 | −1.0 | 2.9 | 0.53 | 0.08 | 2,583 | 2,880 | 1.11 | A | 1,398 | A | Inv. |
| 114 | A | A | 46 | −3.3 | 4.4 | 0.54 | 0.07 | 2,513 | 3,299 | 1.31 | A | 1,442 | A | Inv. |
| 115 | A | A | 40 | −4.8 | 6.2 | 0.55 | 0.06 | 2,443 | 3,718 | 1.52 | A | 1,447 | A | Inv. |
| 116 | A | A | 30 | −9.5 | 10.0 | 0.57 | 0.04 | 2,267 | 4,765 | 2.10 | A | 1,460 | A | Inv. |
| 117 | A | A | 55 | −0.7 | 2.7 | 0.53 | 0.06 | 2,637 | 2,867 | 1.09 | A | 1,387 | A | Inv. |
| 118 | A | A | 46 | −2.4 | 3.7 | 0.54 | 0.08 | 2,565 | 3,283 | 1.28 | A | 1,437 | A | Inv. |
| 119 | A | A | 40 | −3.6 | 5.8 | 0.58 | 0.09 | 2,493 | 3,700 | 1.48 | A | 1,428 | A | Inv. |
| 120 | A | A | 30 | −5.0 | 7.2 | 0.64 | 0.13 | 2,313 | 4,742 | 2.05 | A | 1,401 | A | Inv. |
| 121 | A | A | 55 | 0.0 | 2.8 | 0.53 | 0.05 | 2,690 | 2,853 | 1.06 | A | 1,378 | A | Inv. |
| 122 | A | A | 46 | −0.7 | 3.6 | 0.57 | 0.09 | 2,617 | 3,268 | 1.25 | A | 1,432 | A | Inv. |
| 123 | A | A | 40 | −1.4 | 4.5 | 0.60 | 0.10 | 2,544 | 3,683 | 1.45 | A | 1,421 | A | Inv. |
| 124 | A | A | 30 | −3.0 | 6.4 | 0.70 | 0.18 | 2,360 | 4,719 | 2.00 | A | 1,374 | A | Inv. |
| 125 | A | B | 55 | −0.3 | 1.5 | 0.52 | 0.03 | 2,744 | 2,839 | 1.03 | B | 1,304 | A | Inv. |
| 126 | A | B | 46 | −0.8 | 1.7 | 0.64 | 0.08 | 2,669 | 3,252 | 1.22 | B | 1,312 | A | Inv. |
| 127 | A | C | 40 | −0.9 | 3.2 | 0.87 | 0.12 | 2,594 | 3,665 | 1.41 | C | 956 | B | Comp. |
| 128 | A | C | 30 | −2.2 | 2.9 | 2.08 | 0.22 | 2,407 | 4,697 | 1.95 | C | 906 | B | Comp. |
| 129 | A | B | 55 | 0.2 | 0.4 | 0.52 | 0.03 | 2,797 | 2,825 | 1.01 | B | 1,350 | A | Inv. |
| 130 | A | B | 46 | 0.0 | 0.7 | 0.75 | 0.07 | 2,721 | 3,236 | 1.19 | B | 1,365 | A | Inv. |
| 131 | A | C | 40 | −0.2 | 1.0 | 1.30 | 0.11 | 2,645 | 3,647 | 1.38 | C | 887 | B | Comp. |
| 132 | A | C | 30 | −0.7 | 1.7 | 4.07 | 0.21 | 2,454 | 4,674 | 1.90 | C | 819 | B | Comp. |
| 133 | A | A | 40 | 4.1 | 19.8 | 0.60 | 0.11 | 3,234 | 4,675 | 1.45 | A | 1,417 | A | Inv. |
| 134 | A | A | 40 | 4.6 | 28.3 | 0.65 | 0.10 | 3,162 | 4,566 | 1.44 | B | 1,325 | C | Comp. |
| 135 | A | A | 40 | 2.8 | 18.2 | 0.55 | 0.07 | 2,806 | 4,020 | 1.43 | B | 1,394 | A | Inv. |
| 136 | A | A | 40 | −1.3 | −4.5 | 0.52 | 0.09 | 2,163 | 3,037 | 1.40 | A | 1,430 | A | Inv. |
| 137 | B | C | 40 | −4.7 | −17.0 | 0.53 | 0.10 | 2,121 | 2,972 | 1.40 | C | 1,260 | A | Comp. |
| 138 | A | B | 40 | −3.5 | 9.4 | 0.48 | 0.07 | 2,725 | 3,891 | 1.43 | A | 1,443 | B | Inv. |
| 139 | A | B | 40 | −4.5 | 7.8 | 0.51 | 0.09 | 2,541 | 3,615 | 1.42 | A | 1,430 | B | Inv. |
| 140 | A | A | 40 | −4.3 | 0.2 | 0.60 | 0.20 | 2,754 | 3,883 | 1.41 | A | 1,359 | A | Inv. |
| 141 | B | A | 60 | 0.2 | 2.3 | 0.48 | 0.29 | 2,713 | 2,637 | 0.97 | B | 1,300 | B | Comp. |

As shown in Table 2, liquid crystal displays high in contrast ratio and restrained in light unevenness can be obtained by use of the optical film of the invention.

In the next place, the following things are known.

In optical films 134 and 137 having acryl ratio out of the invention, light leakage is confirmed. Optical film 134 shows great light leakage for the reason that Rth revelation is great and optical compensation performance is low. Further reason is that optical film 137 is inferior in surface state and abounds in luminance.

Optical film 134 shows high degree of light unevenness after aging under high humidity environment and high temperature high humidity environment. Optical film 134 is high in the ratio of cellulose ester having high moisture permeability and water content, as a result strongly influenced by moisture.

Optical films 127, 128, 131 and 132 having total haze greater than 0.80 look whitish in mounting on liquid crystal display, and show high degree of light leakage.

In the comparison of films having good surface state, optical film 141 having a high internal haze value is low in contrast as compared with other films having a low internal haze value, for example, optical films 107, 111, 115 and 119. Since the causes of internal haze are phase separation in film and light scattering due to generation of a craze, in films having low haze, scattered light is also small and contrast is high.

For example, as compared with optical film 141, in optical films 107, 111, 115 and 119, light unevenness at the time of black display after aging under high humidity environment and high temperature high humidity environment difficulty occur. The reason for this is probably that optical films 107, 111, 115 and 119 are high in modulus of elasticity and low in deformation of film under high humidity environment and high temperature high humidity environment.

Further, for example, as compared with optical film 141, optical films 107, 111, 115 and 119 are low in slipping out at the tenter and film rupture at the time of conveying and slitting time of end part. It is considered that optical films 107, 111, 115 and 119 are high in the modulus of elasticity in the transverse direction and film strength is high, so that slipping out at the tenter is difficult to occur, and, since slitting is performed in the transverse direction, film strength in the transverse direction increases and the blade easily enters the film and slitting property is improved. Further, with respect to optical film 137 having the ratio of acrylic resin higher than that in the invention, conveying of soft film is difficult.

In comparing stretched product optical films 105 to 108, 109 to 112, 113 to 116, 117 to 120, 121 to 124 and 141, optical films 105, 109, 113, 117, 121 and 141 having small TD/MD modulus of elasticity are a little low in contrast. The reason for this is presumed that in a sample having a high TD/MD ratio, acrylic resin and cellulose ester in the film are in a more orientated state and turbulence of orientation direction on a molecular level is small, as a result, aberration in the molecular orientation direction in a minute region is lessened.

In comparison of optical films 105 to 124, which are films subjected to stretching at Tg±10° C. of unstretched optical film, with optical films 125 to 132, which are films subjected to stretching at Tg±10° C. or more, difference is small in internal haze but difference is clearly confirmed in total haze, surface state, light leakage, and contrast. Optical films 105 to 124 are good in surface state but in optical films 125 to 132, surface state is inferior, step-like unevenness and luminescent spot are conspicuous, and contrast is low.

What is claimed is:

1. An optical film comprising a cellulose ester and an acrylic resin,
   wherein the mass ratio of the cellulose ester to the acrylic resin is 70/30 to 5/95, the optical film has a total haze value of 0.80 or less, an internal haze value of 0.01 to 0.28, a photoelastic index of 15 Br or less, and a modulus of elasticity of 2,700 to 7,000 MPa in a transverse direction of the optical film.

2. The optical film claimed in claim 1, wherein Re and Rth defined by the following formulae (I) and (II) respectively satisfy the following formulae (III) and (IV) respectively at wavelength of 590 nm:

$$Re = (nx - ny) \times d \quad \text{(I)}$$

$$Rth = [(nx + ny)/2 - nz] \times d \quad \text{(II)}$$

$$|Re| \leq 10 \quad \text{(III)}$$

$$|Rth| \leq 20 \quad \text{(IV)}$$

wherein nx represents a refractive index in a slow axis direction in a plane of the optical film, ny represents a refractive index in a fast axis direction in the plane, nz represents a refractive index in a thickness direction of the optical film, and d represents the thickness (nm) of the optical film.

3. The optical film claimed in claim 1, wherein the mass ratio of the cellulose ester to the acrylic resin is 50/50 to 5/95.

4. The optical film claimed in claim 1, wherein a ratio of the modulus of elasticity in a machine direction (MD) to the modulus of elasticity in the transverse direction (TD) of the cellulose ester film ((modulus of elasticity in TD)/(modulus of elasticity in MD)) is 1.15 or more.

5. The optical film claimed in claim 1, wherein the cellulose ester is cellulose acylate.

6. The optical film claimed in claim 5, wherein the cellulose acylate has a degree of acyl substitution of 1.00 to 2.95.

7. The optical film claimed in claim 1, wherein the acrylic resin contains 50% by mass or more of methyl methacrylate unit.

8. A method for manufacturing an optical film including a cellulose ester and an acrylic resin, the method comprising: forming a polymer film having a mass ratio of the cellulose ester to the acrylic resin of 70/30 to 5/95; and stretching the polymer film within a temperature range of Tg±10° C., wherein Tg is the glass transition temperature of the polymer film, to provide an optical film having a photoelastic index of 15 Br or less.

9. The method claimed in claim 8, wherein a stretching magnification in stretching the polymer film is 1.3 to 2.0.

10. The method claimed in claim 8, wherein the mass ratio of the cellulose ester and acrylic resin is 50/50 to 5/95.

11. The method claimed in claim 8, wherein the polymer film is formed by casting a polymer solution containing the cellulose ester, the acrylic resin and a solvent on a support.

12. The method claimed in claim 8, wherein a modulus of elasticity at Tg+10° C., Tg being a glass transition temperature, of the polymer film is lower than that at Tg by 30% or more.

13. The method claimed in claim 8, wherein the modulus of elasticity of the polymer film before the stretching is 2,000 MPa to 4,500 MPa.

14. A polarizing plate comprising at least one optical film claimed in claim 1.

15. A liquid crystal display comprising at least one polarizing plate claimed in claim 14.

16. The optical film claimed in claim 1, wherein the photoelastic index is in the range of from −3 to 12 Br.

17. The optical film claimed in claim 2, wherein Rth is 0 nm in a region of from 450 to 650 nm.

18. The liquid crystal display claimed in claim 15, wherein the liquid crystal display is an IPS liquid crystal display and the optical film is arranged between an IPS liquid crystal cell and a polarizer.

19. The liquid crystal display claimed in claim 18, wherein the optical film is arranged on both sides of the IPS liquid crystal cell.

* * * * *